United States Patent
Wakashiro et al.

(10) Patent No.: US 6,687,603 B2
(45) Date of Patent: Feb. 3, 2004

(54) ASSIST CONTROL APPARATUS FOR HYBRID VEHICLE

(75) Inventors: Teruo Wakashiro, Shioya-gun (JP); Atsushi Matsubara, Utsunomiya (JP); Shinichi Kitajima, Utsunomiya (JP); Toshinari Shinohara, Utsunomiya (JP); Yasuo Nakamoto, Utsunomiya (JP); Shigeo Hidai, Utsunomiya (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 141 days.

(21) Appl. No.: 10/073,873

(22) Filed: Feb. 14, 2002

(65) Prior Publication Data

US 2002/0116112 A1 Aug. 22, 2002

(30) Foreign Application Priority Data

Feb. 20, 2001 (JP) .................................. P2001-043931

(51) Int. Cl.$^7$ ............................. B60K 6/04; F01L 13/00; F02D 17/02; F02D 41/36; G06G 7/70
(52) U.S. Cl. ................... 701/110; 180/65.2; 123/198 F; 123/481
(58) Field of Search ............................... 701/101, 102, 701/103, 104, 110, 111; 123/325, 326, 481, 198 DB, 198 F, 430; 180/65.2, 65.1; 60/698, 716; 477/2, 3

(56) References Cited

U.S. PATENT DOCUMENTS

| | | | | |
|---|---|---|---|---|
| 5,368,000 A | * | 11/1994 | Koziara | 123/481 |
| 6,305,347 B1 | * | 10/2001 | Russell | 123/295 |
| 6,516,254 B1 | * | 2/2003 | Wakashiro et al. | 123/481 |
| 2002/0112902 A1 | * | 8/2002 | Wakashiro et al. | 180/65.2 |
| 2002/0112903 A1 | * | 8/2002 | Wakashiro et al. | 180/65.2 |
| 2002/0115532 A1 | * | 8/2002 | Wakashiro et al. | 123/198 DB |

FOREIGN PATENT DOCUMENTS

| JP | 2000-97068 | 4/2000 |
|---|---|---|
| JP | 2000-125405 | 4/2000 |

* cited by examiner

Primary Examiner—Willis R. Wolfe
(74) Attorney, Agent, or Firm—Westerman, Hattori, Daniels & Adrian, LLP

(57) ABSTRACT

In an assist control apparatus for a hybrid vehicle comprising an engine as a drive source of the vehicle, and a motor assisting drive of the engine in accordance with driving conditions of the vehicle, the engine is a cylinder deactivating engine switchable between a normal operation and a cylinder deactivating operation, and there is provided a cylinder resumption assist judgment device which judges whether the drive of the engine should be assisted by the motor, when the engine shifts from the cylinder deactivating operation to the normal operation, and when the cylinder resumption assist judgment device judges a resumption from the cylinder deactivated condition, and judges that a throttle opening is larger than a predetermined value, drive of the engine is assisted by the motor.

8 Claims, 17 Drawing Sheets

KPBRGN/KPBRGTH CALCULATION

KPBRGN/KPBRGTH TABLE

MASTTHL/H TABLE

ASSIST CONTROL APPARATUS FOR HYBRID VEHICLE

BACKGROUND OF THE INVENTION

1. Field of the Invention

The present invention relates to an assist control apparatus for a hybrid vehicle for which the cylinders can be stopped. In particular, the invention relates to an assist control apparatus for a hybrid vehicle that can smoothly perform a shift from the cylinder deactivating operation, which closes both intake valves and exhaust valves of an engine, to the normal operation.

2. Description of the Related Art

Heretofore there is known a hybrid vehicle incorporating a motor in addition to an engine as drive sources for vehicle propulsion. One type of such a hybrid vehicle is a parallel hybrid vehicle where the drive output from the engine is assisted by the motor.

In the parallel hybrid vehicle, at the time of acceleration the drive output from the engine is assisted by means of the motor, while at the time of deceleration, various control is carried out such as performing battery charging by deceleration regeneration, so that the residual capacity (electrical energy) of the battery can be maintained while satisfying the requirements of the driver. Furthermore, since the structural mechanism is such that the engine and the motor are arranged in series, the structure can be simplified, and the weight of the whole system can be kept low. Therefore, there is an advantage in that there is a high degree of freedom in vehicle assembly.

As the aforementioned parallel hybrid vehicle, there is a construction in which a clutch is incorporated between the engine and motor (for example, refer to Japanese Unexamined Patent Application, First Publication No. 2000-97068) in order to avoid the influence of engine friction (engine braking) at the time of deceleration regeneration, or the engine, motor and transmission are connected in series (for example, refer to Japanese Unexamined Patent Application, First Publication No. 2000-125405) in order to achieve maximum simplification.

However, in the former construction in which a clutch is installed between the engine and motor, there are disadvantages in that the construction is complicated by the clutch installation and the assembly becomes more difficult, and in addition the transmission efficiency of the power transmission system when running is reduced due to usage of the clutch.

On the other hand, in the latter construction in which the engine, motor and transmission are connected in series, since the amount of regeneration is reduced by the aforementioned engine friction, the electrical energy that could be conserved by regeneration is reduced. Therefore, there is a problem in that the amount of drive assist (assist amount) and the like by the motor are limited.

Furthermore, for a method of reducing engine friction during deceleration in the former type, there is a method for increasing the amount of regeneration by controlling the throttle valve opening at the time of deceleration using an electronic throttle control system to reduce pumping losses. However, since a large amount of fresh air flows as is into the exhaust system, it reduces the temperature of a catalyst and an A/F sensor, and there is a problem in that optimum exhaust gas control is affected detrimentally.

SUMMARY OF THE INVENTION

It is an object of the present invention to provide an assist control apparatus for a hybrid vehicle, which can improve the fuel consumption by the amount by which the engine friction is reduced by making the cylinder deactivating operation possible, and that can smoothly perform a shift from the cylinder deactivating operation to the normal operation.

According to a first aspect of the present invention, an assist control apparatus for a hybrid vehicle comprises an engine as a drive source of the vehicle, and a motor assisting drive of the engine in accordance with driving conditions of the vehicle, wherein the engine is a cylinder deactivating engine which can perform a normal operation and a cylinder deactivated operation, and there is provided a cylinder resumption assist judgment device which judges whether the drive of the engine should be assisted by the motor, when the engine shifts from the cylinder deactivating operation to the normal operation, and when the cylinder resumption assist judgment device detects a resumption from the cylinder deactivated condition and judges that a throttle opening is larger than a predetermined value, drive of the engine is assisted by the motor.

According to this construction, when the cylinder resumption assist judgment device judges a shift from the cylinder deactivating operation to the normal operation, and judges that the throttle opening is larger than a predetermined value, the driving force of the engine which is insufficient due to the cylinder deactivation can be assisted by the motor. As a result, there is the effect that the shift from the cylinder deactivating operation to the normal operation can be smoothly performed without an unpleasant feeling.

In a second aspect of the present invention, the hybrid vehicle comprises an automatic transmission, and the cylinder resumption assist judgment device judges whether the drive of the engine should be assisted by the motor based on the throttle opening and the vehicle speed.

With such a construction, the acceleration intention of the driver can be grasped from the throttle opening and the vehicle speed, instead of the inlet pipe negative pressure, which cannot be used as a reference for judgment, since the cylinders are in the deactivated condition. As a result, there is the effect that the driver's intention can be accurately realized in a hybrid vehicle having an automatic transmission.

In a third aspect of the present invention, the hybrid vehicle comprises a manual transmission, and the cylinder resumption assist judgment device judges whether the drive of the engine should be assisted based on the throttle opening and the engine speed.

With such a construction, the acceleration intention of the driver can be grasped from the throttle opening and the engine speed, instead of from the inlet pipe negative pressure, which cannot be used as a reference for judgment, since the cylinders are in the deactivated condition. As a result, there is the effect that the driver's intention can be accurately realized in a hybrid vehicle having a manual transmission.

In a fourth aspect of the present invention, an amount of drive assist by means of the motor is determined base on engine speed and throttle opening.

With such a construction, since a setting is possible where an engine output equal to the engine output used in the normal operation can be generated, there is the effect that a similar feeling to the acceleration feeling at the time of normal operation can be provided, and the operation can be shifted to the normal operation without an unpleasant feeling.

In a fifth aspect of the present invention, drive assist by means of the motor is continued for a predetermined period of time, after the engine has resumed from the cylinder deactivated operation and the fuel injection amount has been gradually increased and has reached a predetermined value.

With such a construction, the drive of the engine can be assisted by the motor, until the engine generates the normal output, after having resumed from the cylinder deactivated condition and the fuel injection amount has reached a predetermined amount.

DESCRIPTION OF THE PREFERRED EMBODIMENTS

Hereunder is a description of embodiments of the present invention with reference to the figures.

Figure 1:
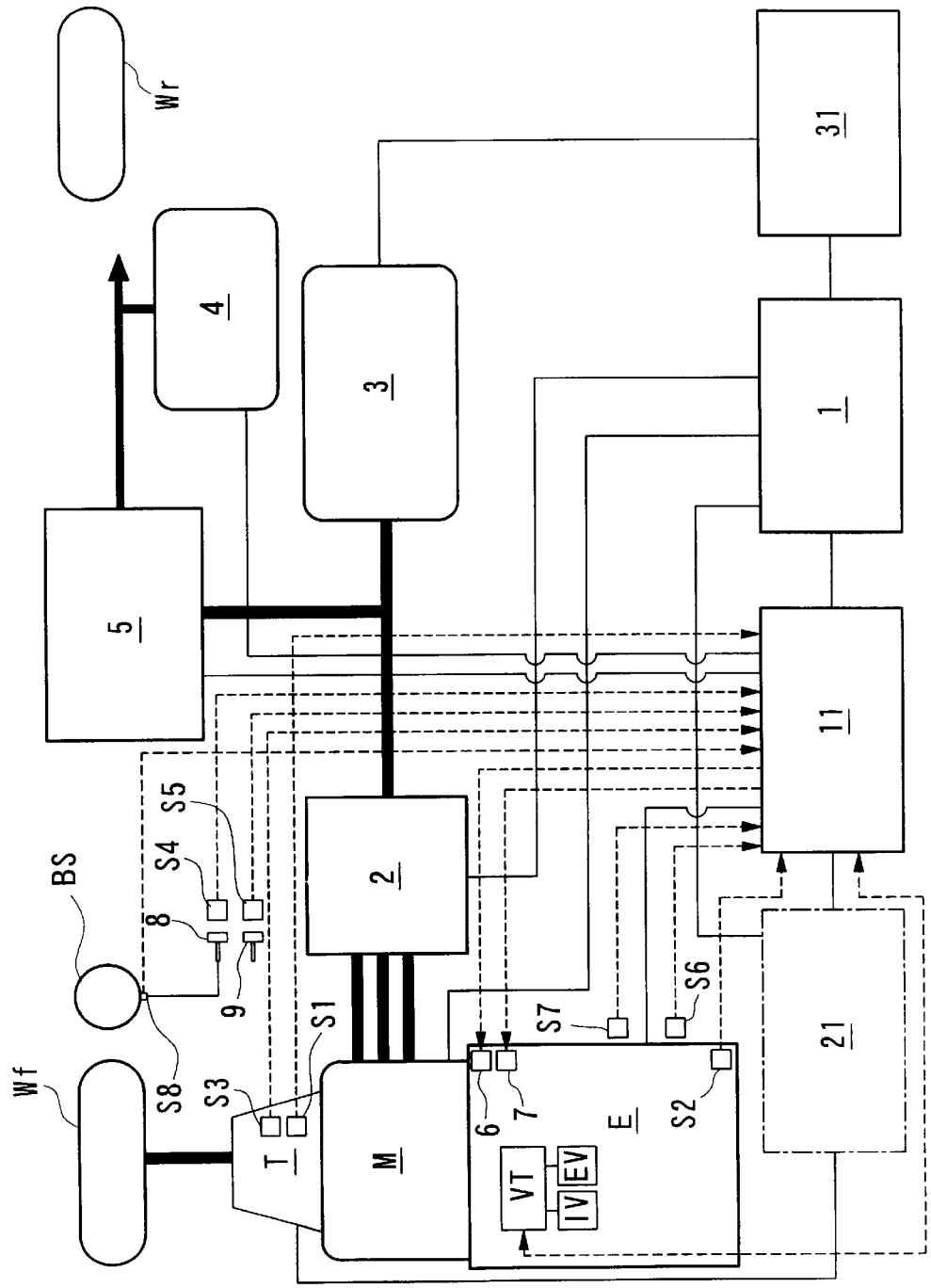
FIG. 1 is a block diagram showing a parallel hybrid vehicle of an embodiment according to the present invention.

FIG. 1 shows a parallel hybrid vehicle of an embodiment of the present invention, in which an engine E, a motor M and a transmission T are connected in series. The driving forces from both the engine E and the motor M are transmitted to front wheels Wf serving as drive wheels via the transmission T comprising either an automatic transmission or a manual transmission. Furthermore, when a driving force is transmitted to the motor M side from the front wheels Wf, at the time of deceleration of the hybrid vehicle, the motor M functions as a generator to produce so called regenerative braking, and the kinetic energy of the vehicle is recovered as electrical energy. The rear wheels are designated as Wr.

The drive and regenerative braking of the motor M are controlled by a power drive unit 2, which receives control instructions from a motor ECU 1. A battery 3 of a high-voltage system for transferring electrical energy to and from the motor M is connected to the power drive unit 2. The battery 3 is constructed from individual modules wherein, for example, a plurality of cells is connected in series, with a plurality of these modules connected in series. Mounted on the hybrid vehicle is a 12 volt auxiliary battery 4 for driving various auxiliary equipment. This auxiliary battery 4 is connected to the battery 3 via a down converter 5. The down converter 5, which is controlled by a FIECU 11, reduces the voltage of the battery 3 to charge the auxiliary battery 4.

The FIECU 11, in addition to the motor ECU 1 and the down converter 5, controls the operation of a fuel supply amount control device 6 for controlling the amount of fuel supplied to the engine E, the operation of a starter motor 7, and also the ignition timing. Therefore, inputs to the FIECU 11 are: a signal from a speed sensor S1 for detecting the speed V based on the speed of rotation of a drive shaft in the transmission T, a signal from an engine revolution speed sensor S2 for detecting engine revolution speed NE, a signal from a gear shift position sensor S3 for detecting the shift position of the transmission T, a signal from a brake switch S4 for detecting the operation of a brake pedal 8, a signal from a clutch switch S5 for detecting the operation of a clutch pedal 9, a signal from a throttle opening sensor S6 for measuring the throttle opening TH, and a signal from an inlet pipe negative pressure sensor S7 for detecting inlet pipe negative pressure PBGA. Numeral 31 denotes a battery ECU that protects the battery 3, and computes the residual capacity QBAT of the battery 3. Here, in the case of a CVT vehicle, a CVT control CVTECU 21 is installed as shown by broken lines in FIG. 1.

BS denotes a brake servo connected to a brake pedal 8, and a negative pressure sensor S8 for detecting the master power internal negative pressure (MPGA) of the brake is installed in this brake servo BS.

This negative pressure sensor S8 is connected to an engine ECU 11.

The abovementioned engine E is a cylinder deactivating engine that is capable of switching between all cylinders operating (normal operation), in which all cylinders operate, and all cylinder deactivating operation, in which all cylinders are deactivated. Although all cylinders are deactivated during the cylinder deactivating operation in this embodiment, it is also possible to perform a partial cylinder deactivating operation in which only a part of cylinders are deactivated.

As shown in FIG. 1, the intake valve IV and exhaust valve EV of each cylinder of the engine E are constructed such that their operation can be stopped by a variable valve timing system VT. The variable valve timing system VT completely closes the intake valve IV and exhaust valve EV of each cylinder when stopping their operation. The variable valve timing system VT is connected to the engine ECU 11.

A specific description will be given using FIG. 2 and FIG. 3.

Figure 2:
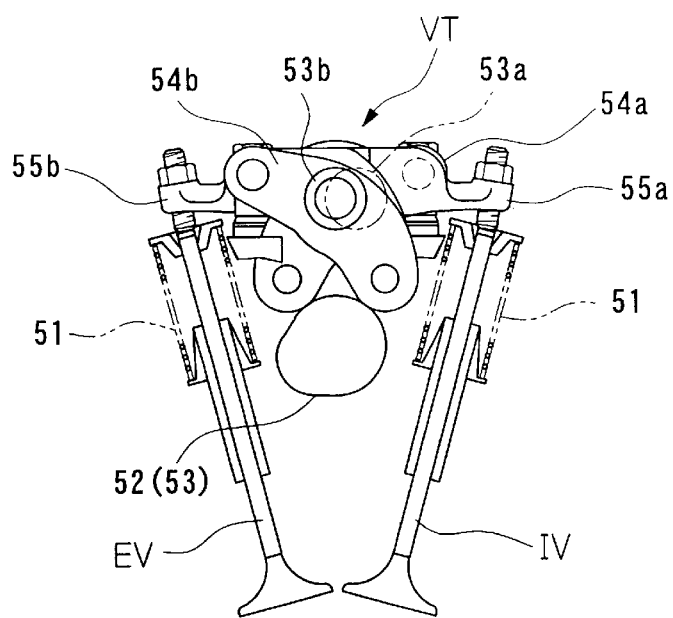
FIG. 2 is a front view of a variable valve timing system of the embodiment.

FIG. 2 shows an example in which a variable valve timing system VT for all cylinder deactivating operation is applied in a SOHC type engine. An intake valve IV and an exhaust valve EV are installed in a cylinder, which is not shown in the figure, and the intake valve IV and exhaust valve EV are mounted at an angle such that the intake and exhaust ports, which are not shown in the figure, are closed by valve springs 51. Also, numeral 52 denotes a lift cam installed on a cam shaft 53. Intake valve and exhaust valve cam lift rocker arms 54a and 54b are linked to this lift cam 52, mounted so as to rotate via intake valve and exhaust valve rocker arm shafts 53a and 53b.

Furthermore, valve drive rocker arms 55a and 55b are rotatably mounted on each of the rocker arm shafts 53a and 53b, adjacent to the cam lift rocker arms 54a and 54b. The moving ends of the rotatable valve drive rocker arms 55a and 55b press the top ends of the intake valve IV and the exhaust valve EV in order to operate the opening of the intake valve IV and the exhaust valve EV. The base ends (opposite ends from the valve interface) of the valve drive rocker arms 55a and 55b are constructed such that they are able to slide on a perfect circle cam 531 installed on the cam shaft 53.

FIG. 3 shows the cam lift rocker arm 54b and the valve drive rocker arm 55b using the exhaust valve as an example.

Figures 3A, 3B:
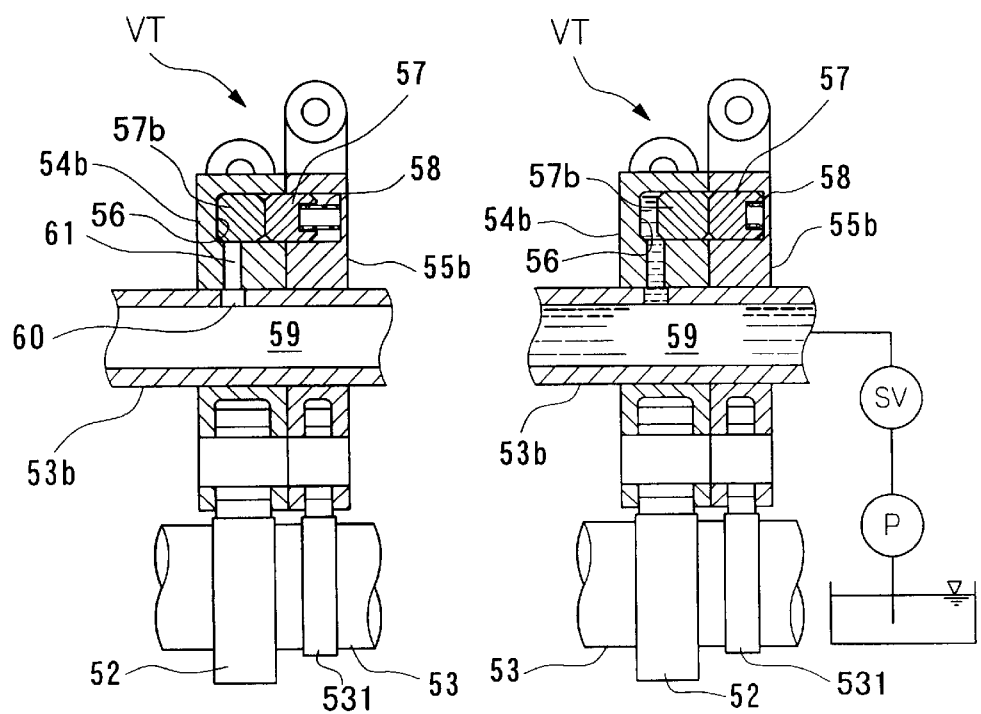
FIG. 3A is a sectional view of the variable valve timing system in an all cylinder operation state.
FIG. 3B is a sectional view of the variable valve timing system in an all cylinder deactivated state.

In FIG. 3A and FIG. 3B, an oil pressure chamber 56 is formed on the opposite side from the lift cam 52, with the exhaust valve rocker arm shaft 53b in the center, in the cam lift rocker arm 54b and the valve drive rocker arm 55b, which extends over both the cam lift rocker arm 54b and the valve drive rocker arm 55b. Inside the oil pressure chamber 56, a pin 57 and a release pin 57b are installed such that these can slide freely. The pin 57 and the release pin 57b are urged toward the cam lift rocker arm 54b side via a pin spring 58.

Furthermore, an oil pressure supply path 59 is formed inside the exhaust valve rocker arm shaft 53b. This oil pressure supply path 59 is communicated with the oil pressure chamber 56 via an opening 60 of the oil pressure supply path 59 and a communication path 61 of the cam lift rocker arm 54b. Working fluid is supplied from an oil pump P to the oil pressure supply path 59 by switching a spool valve SV serving as an actuator. The solenoid of this spool valve SV is connected to the engine ECU 11.

In a case where oil pressure is not applied from the oil pressure supply path 59, as shown in FIG. 3A, the pin 57 is positioned by the pin spring 58 such that it extends between the cam lift rocker arm 54b and the valve drive rocker arm 55b. On the other hand, if oil pressure is applied from the oil supply path 59 by a cylinder deactivation signal, as shown in FIG. 3B, the pin 57 and the release pin 57b slide to the valve drive rocker arm 55b side against the pin spring 58. As a result, the boundary between the pin 57 and the release pin 57b is aligned with the boundary between the cam lift rocker arm 54b and the valve drive rocker arm 55b, thereby releasing the link between the cam lift rocker arm 54b and the valve drive rocker arm 55b. Here, the intake valve has the same construction.

Accordingly, in the case where a later mentioned cylinder deactivation execution previous condition is satisfied, and the all cylinder deactivation cancellation condition is not satisfied, the solenoid of the spool valve SV is driven on by a signal from the engine ECU 11 (F_ALCS=1), and oil pressure is applied from the oil pressure supply path 59 to the oil pressure chamber 56 on both the intake valve and exhaust valve. Then, the pins 57 and the release pins 57 which had linked the cam lift rocker arms 54a and 54b and the valve drive rocker arms 55a and 55b, slide toward the valve drive rocker arms 55a and 55b sides, and the links between the cam lift rocker arms 54a and 54b and the valve drive rocker arms 55a and 55b are released.

As a result, the cam lift rocker arms 54a and 54b are driven by the rotary movement of the lift cam 52. However, the valve drive rocker arms 55a and 55b, whose links with the cam lift rocker arms 54a and 54b by the pins 57 were released, are not driven by either the idle running perfect circle cam 537 or the cam lift rocker arms 54a and 54b, and hence they do not contribute to the opening of the valves IV and EV. As a result, the valves IV and EV remain closed, which enables the all cylinder deactivating operation.

[MA (Motor) Basic Modes]

Figure 4:
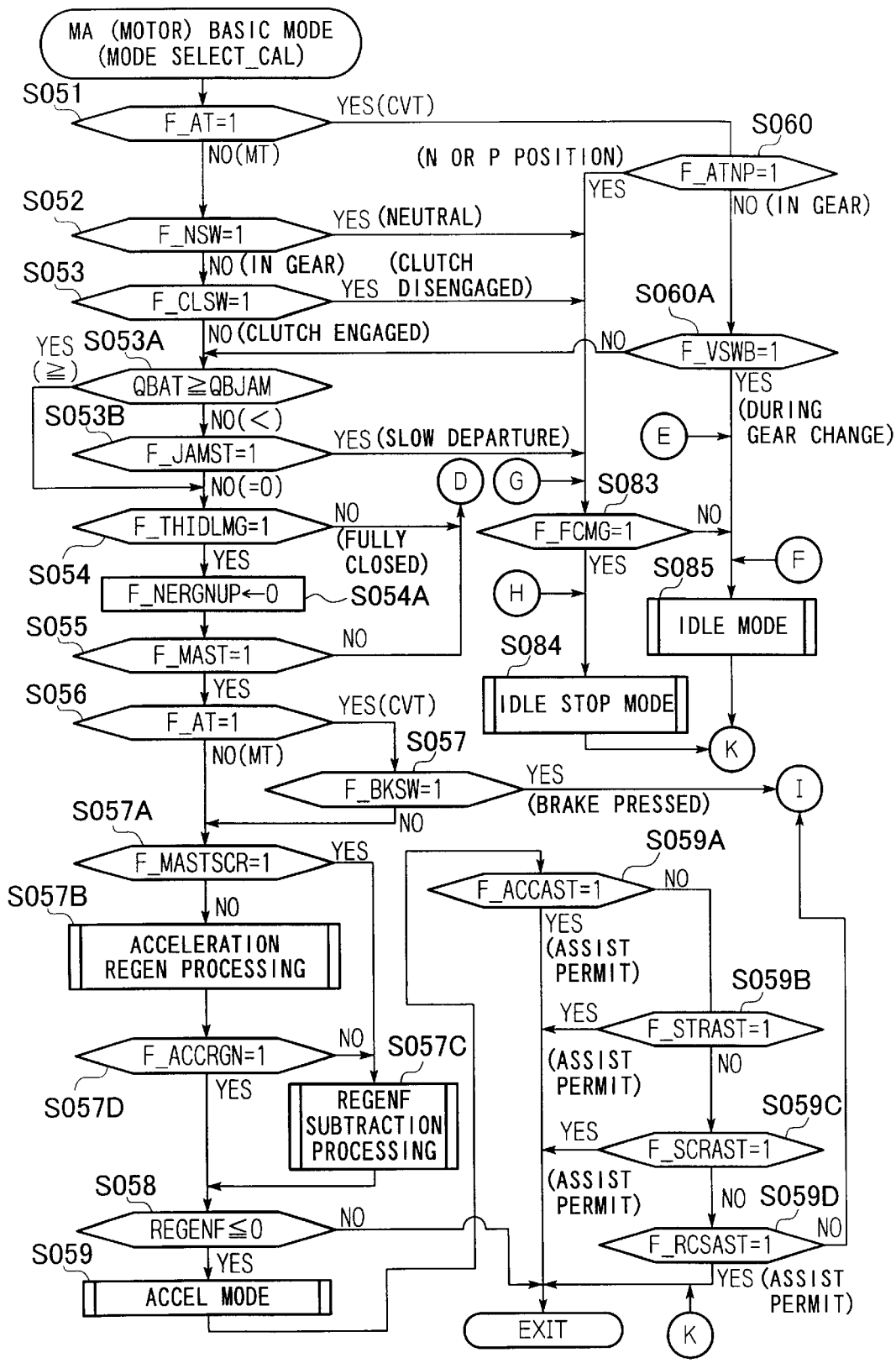
FIG. 4 is a flow chart showing an MA (motor) basic mode of the embodiment.
Figure 5:
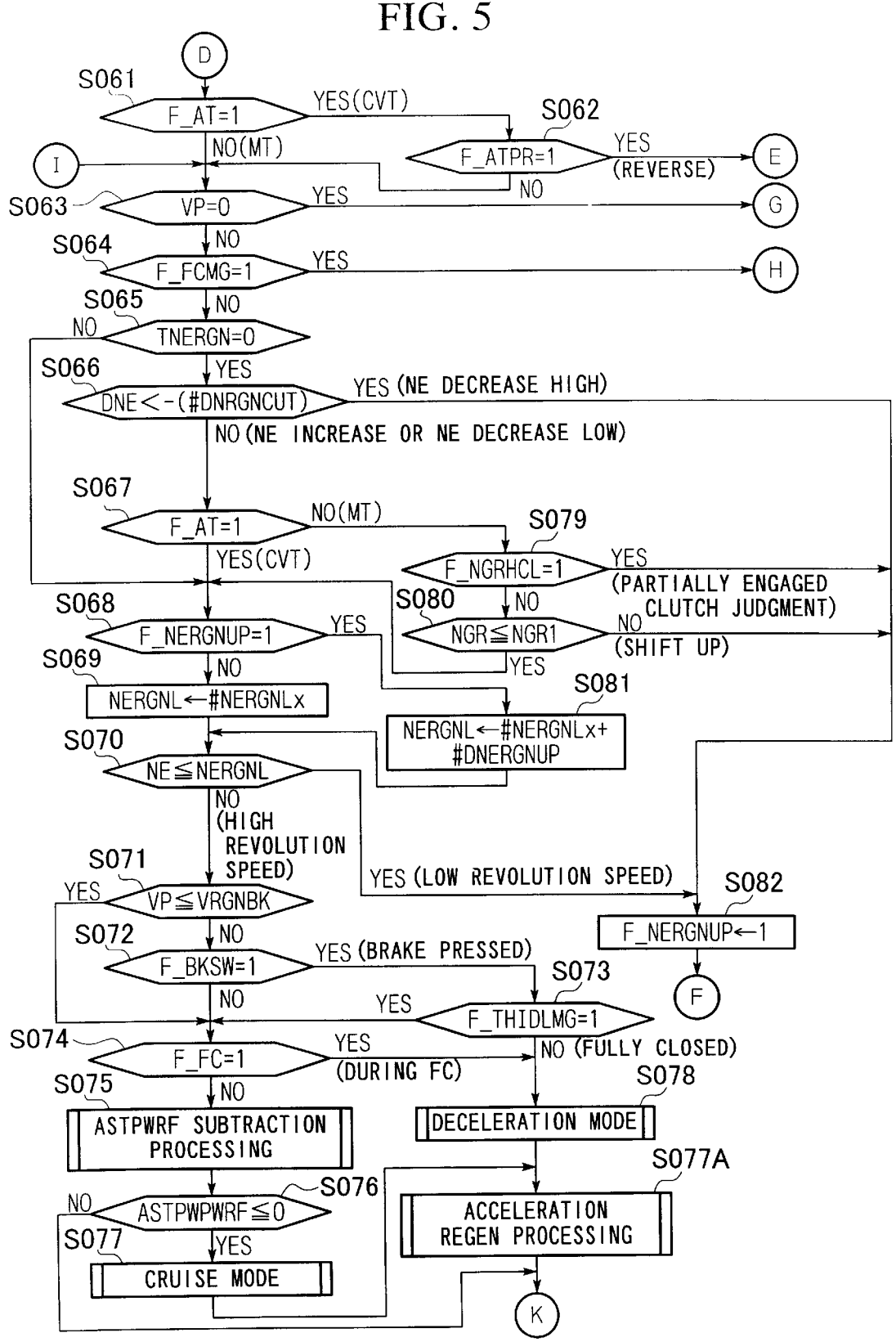
FIG. 5 is a flow chart showing the MA (motor) basic mode of the embodiment.

Next is a description of the MA (motor) basic modes which determine in which mode the motor M will operate, based on the flow charts shown in FIG. 4 and FIG. 5. This processing is repeated at a predetermined cycle time.

The MA (motor) basic modes are: "idle mode", "idle stop mode", "deceleration mode", "cruise mode" and "acceleration mode". In the idle mode, fuel supply is resumed after fuel cut to maintain the engine E in an idle condition, and in the idle stop mode, for example at the time the vehicle is stopped, the engine is stopped in a defined condition. Furthermore, in the deceleration mode, regenerative braking by the motor M is performed. In the acceleration mode, the engine E is drive assisted by the motor M, and in the cruise mode, the motor M is not driven so that the vehicle runs under the driving force of the engine E. In the abovementioned deceleration mode, all cylinders are deactivated.

In step S051 of FIG. 4, it is judged whether an MT/CVT judgment flag F_AT is "1". In the case where the judgment result is "yes" (a CVT vehicle), control proceeds to step S060. In the case where the judgment result is "no" (an MT vehicle), control proceeds to step S052.

Instep S060, for CVT it is judged whether an in gear judgment flag F ATNP is "1". In the case where the judgment result is "yes" (N or P position), control proceeds to step S083, and in the case where the judgment result is "no" (in gear), control proceeds to step S060A.

In step S060A, it is judged whether the gear shift is being operated (shift position cannot be determined due to the gear shift being operated) by whether a gear shifted flag F_VSWB is "1". In the case where the judgment result is "yes" (being shifted), control proceeds to S085, shifts to "idle mode", and terminates. In idle mode, the engine E is maintained in an idle state. In the case where the judgment result of step S060A is "no" (not being shifted), control proceeds to step S053A.

In step S083, it is judged whether an engine stop control execution flag F_FCMG is "1". In the case where the judgment result of step S083 is "no", control shifts to "idle mode" in step S085, and terminates. In the case where the judgment result of step S083 is "yes", control proceeds to step S084, shifts to "idle stop mode", and terminates. In the idle stop mode, for example at the time the vehicle is stopped, the engine is stopped in a defined condition.

In step S052, it is judged whether a neutral position judgment flag F_NSW is "1". In the case where the judgment result is "yes" (neutral position), control proceeds to step S083, and in the case where the judgment result is "no" (in gear), control proceeds to step S053.

In step S053, it is judged whether a clutch engaged judgment flag F_CLSW is "1". In the case where the judgment result is "yes" (clutch is disengaged), control proceeds to step S083, and in the case where the judgment result is "no" (clutch is engaged), control proceeds to step S053A.

In step S053A, it is judged whether the residual battery capacity QBAT is greater than or equal to the low speed departure judgment residual battery capacity QBJAM. In the case where the judgment result is "yes", control proceeds to step S054, and in the case where the judgment result is "no", control proceeds to step S053B.

In step S053B, it is judged whether a low speed departure judgment flag FJAMST is "1". This low speed departure judgment flag F_JAMST is a flag which becomes "1" when a vehicle departs at a low speed and runs slowly. In the case where the judgment result of step S053B is "yes", control proceeds to step S083. In the case where the judgment result of step S053B is "no", control proceeds to step S054. This is because, in the case where a vehicle has a low residual battery capacity and departs slowly, which means there is no intention to accelerate, idle mode or idle stop mode (generating in idle or stopping the engine by the abovementioned engine stop judgment) is preferable in order to protect the battery.

In step S054, it is judged whether an idle judgment flag F_THIDLMG is "1". In the case where the judgment result is "no" (fully closed), control proceeds to step S061, and in the case where the judgment result is "yes" (not fully closed), control proceeds to step S054A.

In step S054A, an engine revolution speed increase flag F_NERGNUP for at the time of partially engaged clutch judgment is set to "0", and control proceeds to step S055. This engine revolution speed increase flag F_NERGNUP for at the time of partially engaged clutch judgment is described later.

In step S055, it is judged whether a motor assist judgment flag F_MAST is "1". This flag judges whether the engine is to be assisted by the motor M. In the case of "1", it means that assist is required, and in the case of "0", assist is not required. Here, this motor assist judgment flag is set by assist trigger judgment processing.

In the case where the judgment result of step S055 is "no", control proceeds to step S061. In the case where the judgment result of step S055 is "yes", control proceeds to step S056.

In step S061, it is judged whether the MT/CVT judgment flag F_AT is "1". In the case where the judgment result is "no" (an MT vehicle), control proceeds to step S063, and in the case where the judgment result is "yes" (a CVT vehicle), control proceeds to step S062.

In step S062, it is judged whether a reverse position judgment flag FATPR is "1". In the case where the judgment result is "yes" (reverse position), control proceeds to step S085, and in the case where the judgment result is "no" (position other than reverse), control proceeds to step S063.

In step S056, it is judged whether the MT/CVT judgment flag F_AT is "1". In the case where the judgment result is "yes" (a CVT vehicle), control proceeds to step S057, and in the case where the judgment result is "no" (an MT vehicle), control proceeds to step S067A.

Instep S057, it is judged whether a brake on judgment flag FBKSW is "1". In the case where the judgment result is "yes" (brake on), control proceeds to step S063, and in the case where the judgment result is "no" (brake off), control proceeds to step S057A.

In step S063, it is judged whether a vehicle speed VP is "0". In the case where the judgment result is "yes", control proceeds to step S083, and in the case where the judgment result is "no", control proceeds to step S064.

In step S064, it is judged whether the engine stop control execution flag F_FCMG is "1". In the case where the judgment result is "no", control proceeds to step S065, and in the case where the judgment result is "yes", control proceeds to step S084.

In step S065, it is judged whether a forced gear change REGEN cancellation judgment processing delay timer TNERGN is "0". In the case where the judgment result is "yes", control proceeds to step S066, and in the case where the judgment result is "no", control proceeds to step S068.

In step S066, it is judged whether the rate of change of engine revolution speed DNE is less than the negative value of a DNE REGEN cut judgment engine revolution speed #DNRGNCUT. Here, the DNE REGEN cut judgment engine revolution speed #DNRGNCUT is the rate of change DNE of engine revolution speed NE which becomes a reference for judging whether the generation amount is to be subtracted, depending on the rate of change of engine revolution speed DNE.

In the case where the judgment result of step S066 is that the decrease (rate of fall) of the engine revolution speed NE is high (yes), control proceeds to step S082. In step S082, the engine revolution speed increase flag F_NERGNUP for at the time of partially engaged clutch judgment is set to "1", and control proceeds to step S085.

As follows is the reason for providing this engine revolution speed increase flag F_NERGNUP for at the time of partially engaged clutch judgment. When the clutch is partially engaged, the engine revolution speed at the time of partially engaged clutch judgment is increased in order to prevent hunting, in which the judgment in step S070 to be mentioned later changes frequently each time the engine revolution speed NE changes with the clutch partially engaged. The engine revolution speed increase flag F_NERGNUP for at the time of partially engaged clutch judgment is set in order to clarify this.

In the case where the judgment result of step S066 is that the engine revolution speed NE is increasing (up), or the decrease (rate of fall) of the engine revolution speed NE is low (no), control proceeds to step S067.

Instep S067, it is judged whether the MT/CVT flag F_AT is "1". In the case where the judgment result is "no" (an MT vehicle), control proceeds to step S079, and in the case where the judgment result is "yes" (a CVT vehicle), control proceeds to step S068.

In step S079, it is judged whether a partially engaged clutch judgment flag F_NGRHCL is "1". In the case where the judgment result is that the clutch is judged to be partially engaged (yes), control proceeds to step S082. Furthermore, in the case where the clutch is not judged to be partially engaged (no), control proceeds to step S080.

In step S080, the previous gear position NGR and the present gear position NGR1 are compared, and it is judged whether there has been a shift up by comparison between the present and previous gear positions.

In the case where the judgment result of step S080 is that the gear position has been shifted up (no), control proceeds to step S082. In the case where the judgment result of step S080 is that the gear position has not been shifted up between the previous and present times (yes), control proceeds to step S068. The reason that control shifts to step S082, and afterwards shifts to idle mode, in this manner when the clutch is partially engaged, is that if regeneration is performed in a partially engaged clutch state, there is a possibility of stalling the engine. Furthermore, the reason that control proceeds to step S082, and afterwards shifts to idle mode, in the case of shifting up, is that if regeneration is performed at the time of low engine revolution speed due to shifting up, there is a possibility of stalling the engine.

In step S068, it is judged whether the engine revolution speed increase flag F_NERGNUP for at the time that the partially engaged clutch judgment is "1". In the case where the judgment result is that an increase in engine revolution speed is required at the time of partially engaged clutch judgment and the flag is set (=1, yes), control proceeds to step S081, a revolution speed increase #DNERGNUP for preventing hunting is added to the charge engine revolution speed lower limit value #NERGNLx, which is set for each gear, this added value is set to the charge engine revolution speed lower limit value NERGNL, and control proceeds to step S070. In the case where the judgment result of step S068 is that an increase in engine revolution speed is not required at the time of partially engaged clutch judgment, and the flag is reset (=0, no), control proceeds to step S069, the charge engine revolution speed lower limit value #NERGNLx, which is set for each gear, is set to the charge engine revolution speed lower limit value NERGNL, and control proceeds to step S070.

Then, in step S070 it is judged whether the engine revolution speed NE is less than or equal to the charge engine revolution speed lower limit value NERGNL. In the case where the judgment result is that it is revolving slowly (NE>NERGNL, yes), control proceeds to step S082. In the case where the judgment result is that it is revolving quickly (NE>NERGNL, no), control proceeds to step S071.

In step S057A, it is judged whether a scramble assist request flag F_MASTSCR is "1". This scramble assist is for improving the perceived feeling of acceleration by increasing the assist amount temporarily at the time of acceleration. Basically, when the rate of throttle change is high, the arrangement is such that the scramble assist request flag F_MASTSCR is set to "1".

In the case where the judgment result of step S057A is "no", acceleration REGEN processing is performed in step S057B, and control proceeds to step S057D. Furthermore, in the case where the judgment result of step S057A is "yes", subtraction processing for a final charge instruction value REGENF is performed in step S057C, and control proceeds to step S058.

In step S057D, it is judged whether an acceleration REGEN processing flag F_ACCRGN is "1". In the case where the judgment result is "yes" (processing has been performed), control proceeds to step S058, and in the case where the judgment result is "no" (processing has not been performed), control proceeds to step S057C.

In step S058, it is judged whether the final charge instruction value REGENF is less than or equal to "0". In the case where the judgment result is "yes", control proceeds to "acceleration mode" in step S059. In acceleration mode, the engine E is drive assisted by the motor M, and control proceeds to step S059A. In the case where the judgment result of step S058 is "no", control terminates.

In step S059A, it is judged whether an assist permit flag F_ACCAST is "1". In the case where the judgment result is "yes", control terminates, and in the case where the judgment result is "no", control proceeds to step S059B.

In step S059B, it is judged whether a departure assist permit flag F_STRAST is "1". In the case where the judgment result is "yes", control terminates, and in the case where the judgment result is "no", control proceeds to step S059C.

In step S059C, it is judged whether a scramble assist permit flag F_SCRAST is "1". In the case where the judgment result is "yes", control terminates, and in the case where the judgment result is "no", control proceeds to step S059D.

In step S059D, it is judged whether a cylinder deactivation resumption assist permit flag F_RCSAST is "1". In the case where the judgment result is "yes", control terminates, and in the case where the judgment result is "no", control proceeds to step S063. Here, the case where the cylinder deactivation resumption assist permit flag F_RCSAST is "1", means that drive assist by the motor is permitted when shifting from all cylinder deactivating operation to be described later to all cylinder (normal) operation.

In step S071, it is judged whether the vehicle speed VP is less than or equal to the deceleration mode brake judgment lower vehicle speed limit #VRGNBK. Here, this deceleration mode brake judgment lower vehicle speed limit #VRGNBK is a value with hysteresis. In the case where the judgment result is that the vehicle speed VP≦the deceleration mode brake judgment lower vehicle speed limit #VRGNBK (yes), control proceeds to step S074. In the case where the judgment result in step S071 is that the vehicle speed VP >the deceleration mode brake judgment lower vehicle speed limit #VRGNBK (no), control proceeds to step S072.

In step S072, it is judged whether a brake on judgment flag F_BKSW is "1". In the case where the judgment result is "yes", control proceeds to step S073, and in the case where the judgment result is "no", control proceeds to step S074.

In step S073, it is judged whether an idle judgment flag F_THIDLMG is "1". In the case where the judgment result is "no" (throttle is fully closed), control proceeds to "deceleration mode" in step S078, acceleration REGEN processing is performed in step S077A, and control terminates. Here, in deceleration mode, regenerative braking is performed by the motor M. However, in deceleration mode all cylinders are deactivated, so that the amount of regeneration by the motor M can be increased by the amount that engine friction is reduced. In the case where the judgment result of step S073 is "yes" (throttle is not fully closed), control proceeds to step S074.

In step S074, it is judged whether a fuel cut flag F_FC is "1". This flag is a fuel cut judgment flag, which becomes "1" when regeneration by the motor M is performed in "deceleration mode" in step S078, and cuts the fuel off. If the result of the judgment in step S074 is that deceleration fuel cut is in effect (yes), control proceeds to step S078. If the result of the judgment in step S074 is that fuel cut is not in effect (no), control proceeds to step S075, where the final assist instruction value ASTPWRF is subtracted, and then proceeds to step S076.

In step S076, it is judged whether the final assist instruction value ASTPWRF is less than or equal to "0". In the case where the judgment result is "yes", control shifts to "cruise mode" in step S077, acceleration REGEN processing is performed in step S077A, and control terminates. In cruise mode the motor M is not driven and the vehicle runs under the driving force of the engine E. Furthermore, the battery 3 may be charged by regenerative operation of the motor M or by using the motor as a generator depending on the running conditions of the vehicle.

In the case where the judgment result of step S076 is "no", control terminates.

[All Cylinder deactivating operation Switching Execution Processing]

Figure 6:
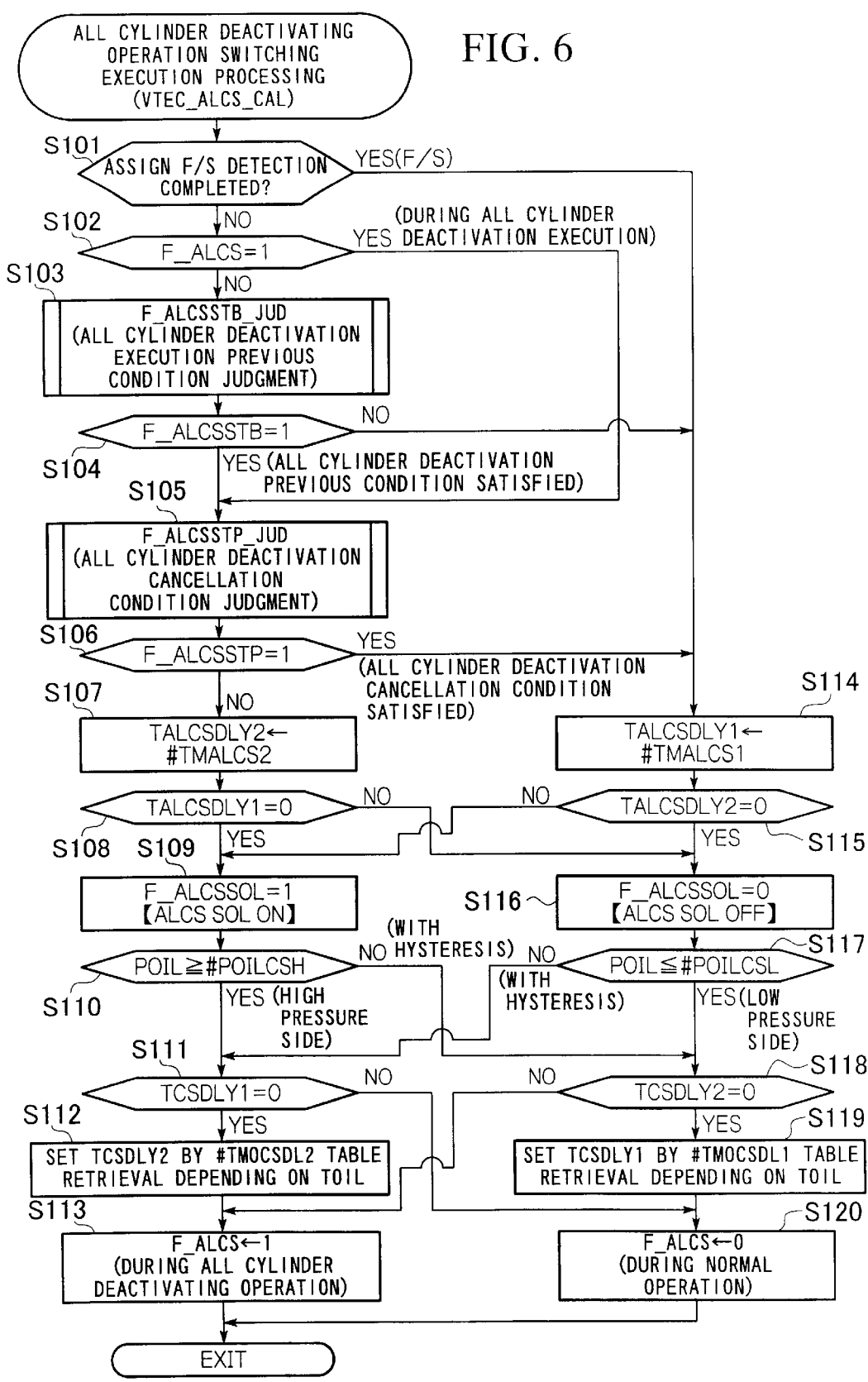
FIG. 6 is a flow chart showing all cylinder deactivating operation switching execution processing of the embodiment.

Next is a description of all cylinder deactivating operation switching execution processing based on FIG. 6.

Here, all cylinder deactivating operation means an operation that closes the intake valves and exhaust valves by the aforementioned variable valve timing system VT at the time of deceleration regeneration under certain conditions, and is performed in order to reduce engine friction and to increase the amount of deceleration regeneration. In the following flow chart a flag (all cylinder deactivation execution flag F_ALCS) is set and reset to switch between an all cylinder deactivating operation and a normal operation that does not stop the cylinders, in a predetermined cycle time.

In step S101, it is judged whether assignment F/S (fail safe) detection is completed. In the case where the judgment result is "no", control proceeds to step S102, and in the case where the judgment result is "yes", control proceeds to step S114. This is because if there is any abnormality, all cylinders should not be deactivated.

In step S 102, it is judged whether the all cylinder deactivating operation is active by whether an all cylinder deactivation execution flag F ALCS is "1". The all cylinder deactivation execution flag F_ALCS is a flag set in this flow chart. In the case where the flag is set to "1", the all cylinder deactivating operation is performed, and in the case of "0", all cylinder deactivation is not performed, but normal operation is performed.

In the case where the judgment result of step S102 is "yes", and all cylinder deactivation is in effect, control proceeds to step S105. Accordingly, if all cylinder deactivation is judged to be in effect (F_ALCS=1) by an all cylinder deactivation execution previous condition judgment to be mentioned later, all cylinder deactivation previous condition judgment is not performed. In the case where the judgment result of step S102 is "no", and all cylinder deactivation is not in effect, in step S103 an all cylinder deactivation execution previous condition judgment (F_ALCSSTB_JUD) is performed, and control proceeds to step S104. All cylinders are deactivated only in the case where the previous condition is satisfied by the all cylinder deactivation execution previous condition judgment.

In step S104, it is judged whether an all cylinder deactivation standby flag F_ALCSSTB is "1". This flag is set to "1" when the previous condition is satisfied by the judgment in step S103, and is "0" when it is not satisfied. By means of this flag, whether to execute cylinder deactivation in accordance with driving conditions of the vehicle is judged. In the case where the judgment result of step S104 is "yes", since the previous condition is satisfied, control proceeds to step S105. In the case where the judgment result of step S104 is "no", since the previous condition is not satisfied, control proceeds to step S114.

In step S105, an all cylinder deactivation cancellation condition judgment (F_ALCSSTP_JUD), to be described later, is performed, and control proceeds to step S106. In the case where the cancellation condition is satisfied by this all cylinder deactivation cancellation condition judgment, all cylinder deactivating operation is not executed. The all cylinder deactivation cancellation condition judgment is always performed when the processing of FIG. 6 is performed, which is different from the all cylinder deactivation previous condition judgment.

In step S106, it is judged whether an all cylinder deactivation cancellation condition satisfied flag F_ALCSSTP is "1". This flag is set to "1" when the cancellation condition is satisfied by the judgment in step S105, and is set to "0" when not satisfied. By means of this flag, whether to cancel cylinder deactivation in accordance with driving conditions of the vehicle during engine cylinder deactivating operation is judged. In the case where the judgment result of step S106 is "yes", since the cancellation condition is satisfied, control proceeds to step S114. In the case where the judgment result of step S106 is "no", since the cancellation condition is not satisfied, control proceeds to step S107.

In step S107, a solenoid off delay timer TALCSDLY2 for the aforementioned spool valve SV is set to a predetermined value #TMALCS2, and control proceeds to step S108. This is to ensure a certain time period from when the judgment in step S105 is completed until the solenoid of the aforementioned spool valve SV finishes being turned off in step S116 to be mentioned later, when all cylinder deactivating operation is shifted to normal operation.

In step S108, it is judged whether a solenoid on delay timer TALCSDLY1 to be described later is "0". In the case where the judgment result is "yes", since a certain time has passed, control proceeds to step S109. In the case where the judgment result of step S108 is "no", since a certain time has not passed, control proceeds to step s116.

In step S109, an all cylinder deactivation solenoid flag F_ALCSSOL is set to "1" (all cylinder deactivation solenoid of the spool valve SV is turned on), and control proceeds to step S110.

In step S110, it is judged by an oil pressure sensor whether oil pressure is actually generated by the solenoid being turned on for all cylinder deactivation. To be specific, it is judged whether the engine oil pressure POIL is greater than or equal to an all cylinder deactivating operation execution judgment oil pressure #POILCSH (for example, it is judged whether it is greater than or equal to 137 kPa (=1.4 kg/cm$^2$)). In the case where the judgment result is "yes", which means on the high pressure side, control proceeds to step S111. In the case where the judgment result is "no" (there is hysteresis), control proceeds to step S118. Here, it is also possible to judge using an oil switch instead of an oil pressure sensor.

In step S111, it is judged whether an all cylinder deactivating operation execution delay timer TCSDLY1 is "0" in order to ensure a certain time period from when the spool valve SV is switched on until the oil pressure is applied. In the case where the judgment result is "yes", control proceeds to step S112. In the case where the judgment result is "no", control proceeds to step S120.

In step S112, an all cylinder deactivating operation cancellation delay timer TCSDLY2 is set to a timer value #TMOCSDL2 retrieved from a look up table depending on oil temperature TOIL measured by an oil temperature sensor This is because oil temperature has an influence on operating delays. For instance if the oil temperature is low, it takes longer for the oil pressure to rise. Therefore this timer value #TMOCSDL2 increases as the oil temperature decreases.

Then, in step S113 the all cylinder deactivation execution flag F_ALCS is set to "1", and control terminates. Here, in step S112 the aforementioned timer value may be retrieved based on engine temperature instead of oil temperature.

In step S114, the solenoid on delay timer TALCSDLY1 of the spool valve SV is set to a predetermined value #TMALCS1, and control proceeds to step S115. This is to ensure a certain time period between when the judgment in step S105 is completed and the solenoid of the spool valve SV is turned on in step S109, when normal operation changes to all cylinder deactivating operation.

In step S115, it is judged whether the solenoid off delay timer TALCSDLY2 is "0". In the case where the judgment result is "yes", since a certain time has passed, control proceeds to step S116. In the case where the judgment result of step S115 is "no", since a certain time has not passed, control proceeds to step S109.

In step S116, the all cylinder deactivation solenoid flag F_ALCSSOL is set to "1" (all cylinder deactivation solenoid of the spool valve SV is turned off), and control proceeds to step S117.

In step S117, it is judged by the oil pressure sensor whether oil pressure is actually cancelled by turning off the solenoid for all cylinder deactivation cancellation. To be specific, it is judged whether the engine oil pressure POIL is less than or equal to the all cylinder deactivating operation cancellation judgment oil pressure #POILCSL (for example, 98 kPa (=1.0 kg/cm$^2$)). In the case where the judgment result is "yes", which means on the low pressure side, control proceeds to step S118. In the case where the judgment result is "no" (there is hysteresis), control proceeds to step S111. In this case, it is also possible to use an oil switch instead of an oil pressure sensor.

In step S118, it is judged whether the all cylinder deactivating operation execution delay timer TCSDLY2 is "0" in order to ensure a certain time period from when the spool valve SV is switched off until the oil pressure is cancelled. In the case where the judgment result is "yes", control proceeds to step S119. In the case where the judgment result is "no", control proceeds to step S113.

In step S119, the all cylinder deactivating operation execution delay timer TCSDLY1 is set to a timer value #TMOCSDL1 retrieved from a look up table depending on oil temperature TOIL measured by an oil temperature sensor. This is because oil temperature has an influence on operating delays. For instance if the oil temperature is low, it takes longer for the oil pressure to rise. Therefore this timer value #TMOCSDL1 increases as the oil temperature decreases.

Then, in step S120, the all cylinder deactivation execution flag F_ALCS is set to "0", and control terminates. Here, in step S119 the aforementioned timer value may be retrieved based on engine temperature instead of oil temperature.

[All Cylinder deactivation Previous Condition Execution Judgment Processing]

Figure 7:
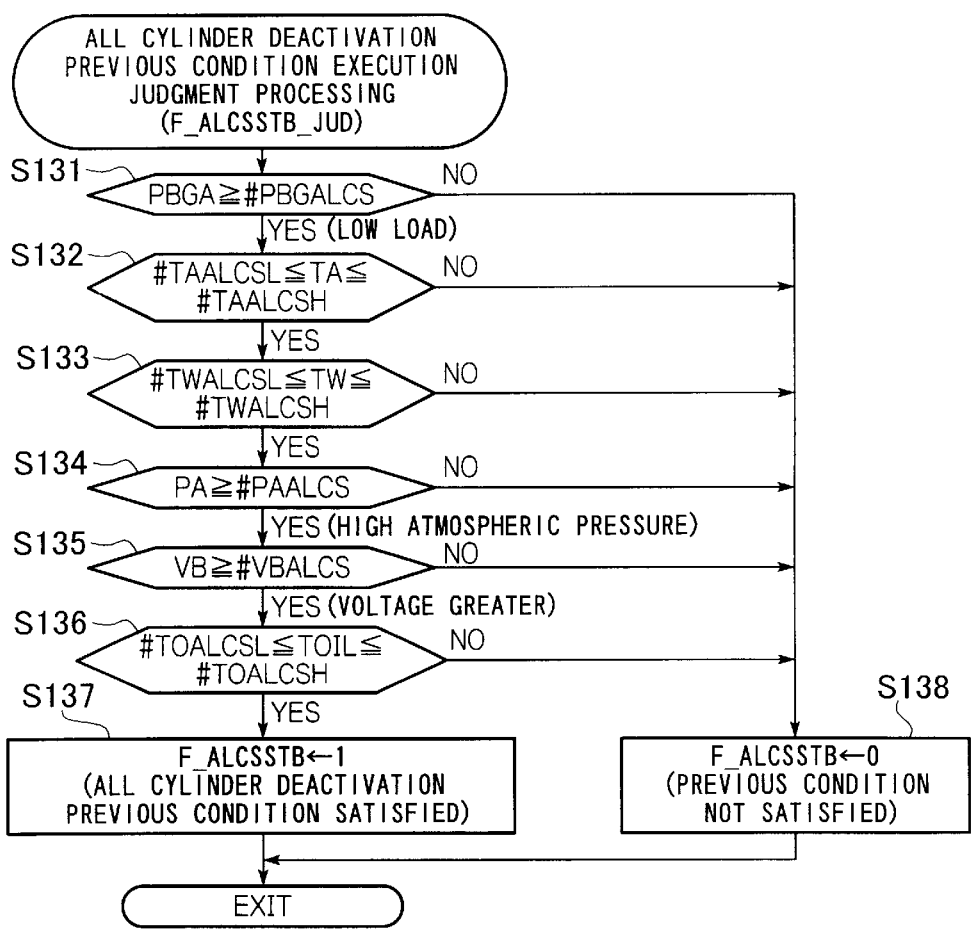
FIG. 7 is a flow chart showing all cylinder deactivation previous condition execution judgment processing of the embodiment.

Next is a description of all cylinder deactivation previous condition execution judgment processing in step S103 of FIG. 6, based on FIG. 7. This processing is repeated at a predetermined cycle time.

In step S131, it is judged whether the inlet pipe negative pressure PBGA is on the atmospheric pressure side is greater than or equal to an all cylinder deactivation execution upper negative pressure limit #PBGALCS (for example, −40 kPa (=−300 mmHg)). This is because if the engine load is high, it is not desirable to perform all cylinder deactivation. In the case where the judgment result of step S131 is "yes" (low load), control proceeds to step S132, and in the case where the judgment result is "no", control proceeds to step S138.

In step S138, since the all cylinder deactivation previous condition is not satisfied, the all cylinder deactivation standby flag F_ALCSSTB is set to "0", and control terminates.

In step S132, it is judged whether an outside air temperature TA is within a predetermined range (all cylinder deactivation execution lower air temperature limit #TAALCSL (for example 0° C.)≦TA≦all cylinder deactivation execution upper air temperature limit #TAALCSH (for example 50° C.)). In the case where the judgment result of step S132 is that the outside air temperature TA is within the predetermined range, control proceeds to step S133. In the case where the judgment result is that the outside air temperature is outside of the predetermined range, control proceeds to step S138. This is because if all cylinder deactivation is performed in a case where the outside air temperature TA is lower than the all cylinder deactivation execution lower air temperature limit #TAALCSL, or higher than the all cylinder deactivation execution upper air temperature limit #TAALCSH, the engine becomes unstable.

In step S133, it is judged whether a cooling water temperature TW is within a predetermined range (all cylinder deactivation execution lower cooling water temperature limit #TWALCSL (for example 70° C.)≦TW≦all cylinder deactivation execution upper cooling water temperature limit #TAALCSH (for example 100° C.)). In the case where the judgment result of step S133 is that the cooling water temperature TW is within the predetermined range, control proceeds to step S134. In the case where it is outside of the predetermined range, control proceeds to step S138. This is because if all cylinder deactivation is performed in a case where the cooling water temperature TW is lower than the all cylinder deactivation execution lower cooling water temperature limit #TWALCSL, or higher than the all cylinder deactivation execution upper cooling water temperature limit #TWALCSH, the engine becomes unstable.

In step S134, it is judged whether atmospheric pressure PA is greater than or equal to an all cylinder deactivation execution upper atmospheric pressure limit #PAALCS (for example 77.3 kPa (=580 mmHg)). In the case where the judgment result of step S134 is "yes" (high atmospheric pressure), control proceeds to step S135, and in the case where the judgment result is "no", control proceeds to step S138. This is because when atmospheric pressure is low, it is not desirable to perform all cylinder deactivation. (For example, because there is a possibility of not ensuring a sufficient level of the brake master power negative pressure at the time of brake operation.)

In step S135, it is judged whether the voltage (drive source voltage)VB of the 12 volt auxiliary battery 4 is greater than or equal to an all cylinder deactivation execution upper voltage limit #VBALCS (for example 10.5V). In the case where the judgment result is "yes" (high voltage), control proceeds to step S136, and in the case where the judgment result is "no", control proceeds to step S138. This is because if the voltage VB of the 12 volt auxiliary battery 4 is less than a predetermined value, the responsiveness of the spool valve SV deteriorates. This is to counter the possibility of the battery voltage falling in a low temperature environment or the battery deteriorating.

In step S136, it is judged whether the oil temperature TOIL is within a predetermined range (all cylinder deactivation execution lower oil temperature limit #TOALCSL (for example 70° C.)≦TOIL≦all cylinder deactivation execution upper oil temperature limit #TOALCSH (for example 100° C.)). In the case where the judgment result of step S136 is that the oil temperature TOIL is within the predetermined range, control proceeds to step S137. In the case where it is outside of the predetermined range, control proceeds to step S138. This is because if all cylinder deactivation is performed when the oil temperature TOIL is lower than the all cylinder deactivation execution lower oil temperature limit #TOALCSL, or higher than the all cylinder deactivation execution upper oil temperature limit #TOALCSH, the switching response between the engine operating and all cylinders being deactivated would be unstable.

In step S137, since the all cylinder deactivation previous condition is satisfied, the all cylinder deactivation standby flag F_ALCSSTB is set to "1", and control terminates.

[All Cylinder deactivation Cancellation Condition Judgment Processing]

Figure 8:
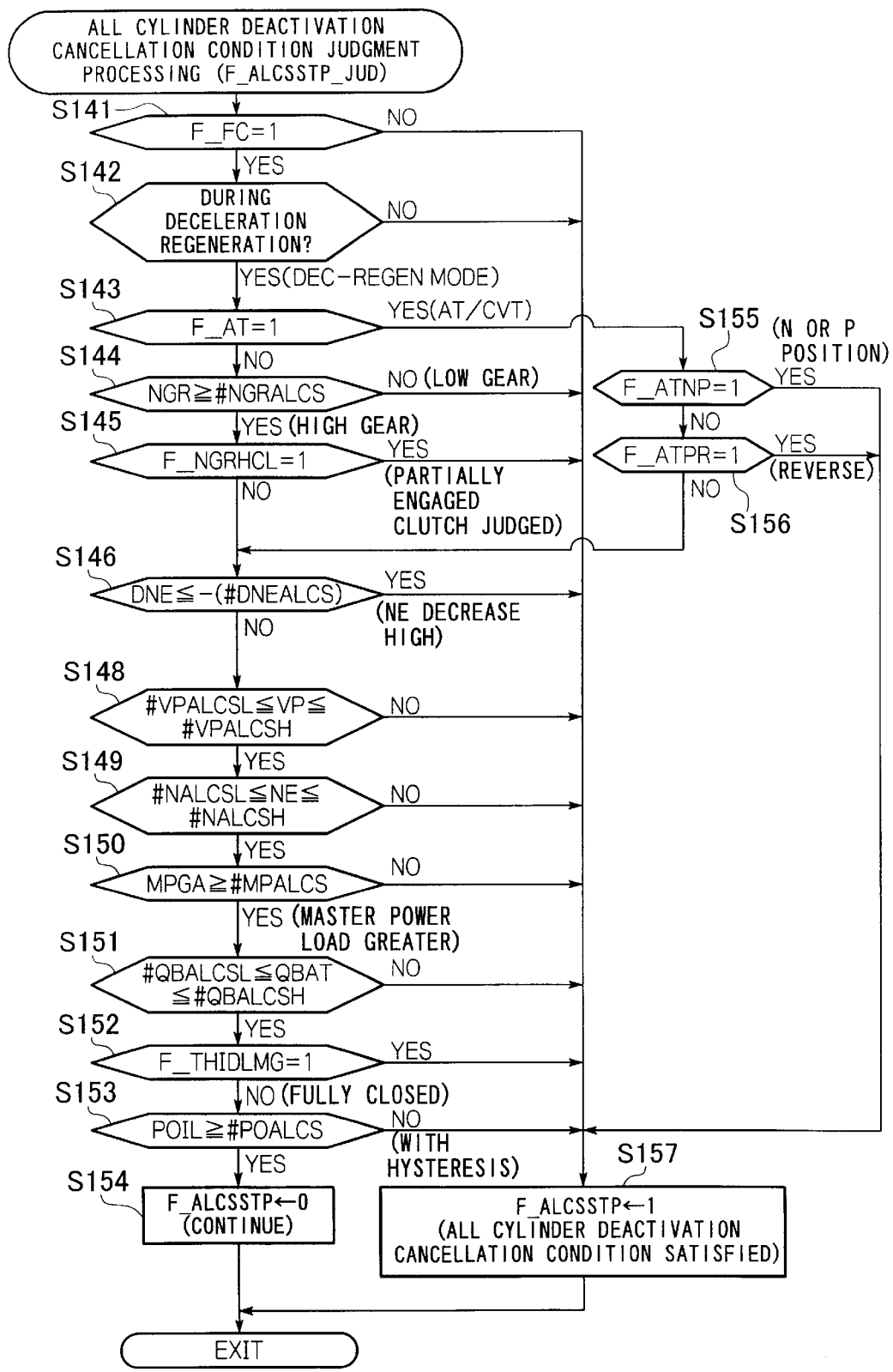
FIG. 8 is a flow chart showing all cylinder deactivation cancellation condition judgment processing of the embodiment.

Next is a description of all cylinder deactivation cancellation condition judgment processing in step S105 of FIG. 6, based on FIG. 8. This processing is repeated at a predetermined cycle time.

In step S141, it is judged whether the fuel cut flag F_FC is "1". In the case where the judgment result of step S141 is "yes", control proceeds to step S142, and in the case where the judgment result is "no", control proceeds to step S157. This judgment is because all cylinder deactivation is aimed at reducing engine friction at the time of deceleration fuel cut, and increasing the amount of regeneration by the reduced amount.

In step S157, since the all cylinder deactivation cancellation condition is satisfied, the all cylinder deactivation cancellation condition satisfied flag F_ALCSSTB is set to "1", and control terminates.

In step S142, it is judged whether deceleration regeneration is in effect. In the case where the judgment result of step S142 is "yes", control proceeds to step S143, and in the case where the judgment result is "no", control proceeds to step S157.

In step S143, it is judged whether the MT/CVT judgment flag F_AT is "1". In the case where the judgment result is "no" (an MT vehicle), control proceeds to step S144. In the case where the judgment result is "yes" (an AT/CVT vehicle), control proceeds to step S155.

In step S155, it is judged whether the in gear judgment flag F_ATNP is "1". In the case where the judgment result is "no" (in gear), control proceeds to step S156. In the case where the judgment result is "yes" (N or P position), control proceeds to step S157.

In step S156, it is judged whether the reverse position judgment flag F_ATPR is "1". In the case where the judgment result is "yes" (reverse position), control proceeds to step S157. In the case where the judgment result is "no" (position other than reverse), control proceeds to step S146.

All cylinder deactivation in the N or P position and reverse position is cancelled by the processing of step S155 and step S156.

In step S144, it is judged whether the previous gear position NGR is higher than the all cylinder deactivation continuation lower gear position limit #NGRALCS (including this position, for example third gear). In the case where the judgment result is "yes" (higher gear), control proceeds to step S145, and in the case where the judgment result is "no" (lower gear), control proceeds to step S157. This is to avoid stopping the cylinders frequently due to a reduction in the regeneration rate, or traffic congestion and the like, in a low gear.

In step S145, it is judged whether the partially engaged clutch judgment flag F_NGRHCL is "1" (partially engaged clutch). In the case where the judgment result is "yes" (partially engaged clutch), control proceeds to step S157, and in the case where the judgment result is "no", control proceeds to step S146. Accordingly, it is possible to prevent unnecessarily stopping the cylinders which causes errors such as, for example, stalling the engine by stopping the vehicle on a partially engaged clutch, or changing gear while accelerating on a partially engaged clutch.

In step S146, it is judged whether the rate of change DNE of the engine revolution speed is less than or equal to the negative value of an all cylinder deactivation execution upper engine revolution speed change range limit #DNEALCS (for example−100 rpm). In the case where the judgment result is "yes" (rate of decrease of engine revolution speed is high), control proceeds to step S157, and in the case where the judgment result is "no", control proceeds to step S148. This is to prevent the engine from stalling when all cylinder deactivation is performed when the rate of decrease of the engine revolution speed is high.

In step S148, it is judged whether the vehicle speed VP is within a predetermined range (all cylinder deactivation continuation execution lower vehicle speed limit #VPALCSL (for example 10 km/h)≦VP≦all cylinder deactivation continuation execution upper vehicle speed limit #VPALCSH (for example 60 km/h)). As a result of the judgment in step S148, if it is judged that the vehicle speed VP is within the predetermined range, control proceeds to step S149. If the vehicle speed VP is outside of the predetermined range, control proceeds to step S157. In a case where the vehicle speed VP is lower than the all cylinder deactivation continuation execution lower vehicle speed limit #VPALCSL, or higher than the all cylinder deactivation continuation execution upper vehicle speed limit #VPALCSH, all cylinder deactivation is cancelled.

In step S149, it is judged whether the engine revolution speed is within a predetermined range (all cylinder deactivation continuation execution lower engine revolution speed limit #NALCSL (for example 800 rpm)≦NE≦all cylinder deactivation continuation execution upper engine revolution speed limit #NALCSH (for example 3000 rpm)). As a result of the judgment in step S149, if it is judged that the engine revolution speed NE is within the predetermined range, control proceeds to step S150. If the engine revolution speed NE is outside of the predetermined range, control proceeds to step S157. In the case where the engine revolution speed NE is lower than the all cylinder deactivation continuation execution lower engine revolution speed limit #NALCSL, or higher than the all cylinder deactivation continuation execution upper engine revolution speed limit #NALCSH, all cylinder deactivation is cancelled. This is because if the engine revolution speed NE is low, there is a possibility that the regeneration efficiency is low, and that the oil pressure required for all cylinder deactivation switching cannot be ensured. Furthermore, this is because if the engine revolution speed NE is too high, the oil pressure becomes too high due to high revolution speed, and there is a possibility that the switch to cylinder deactivation cannot be performed. Moreover, this is because there is a possibility of a deterioration in the consumption of hydraulic fluid for cylinder deactivation.

In step S150, it is judged whether the brake master power internal negative pressure MPGA is greater than or equal to an all cylinder deactivation continuation execution upper negative pressure limit #MPALCS (for example −26.7 kPa (=−200 mmHg)). As a result of the judgment in step S150, if the brake master power internal negative pressure MPGA is, on the atmospheric pressure side, greater than or equal to the all cylinder deactivation continuation execution upper negative pressure limit #MPALCS (MPGA≦#MPACLS, yes), control proceeds to step S151. As a result of the judgment in step S150, if the brake master power internal negative pressure MPGA is lower than the all cylinder deactivation continuation execution upper negative pressure limit #MPALCS (MPGA<#MPACLS, no), control proceeds to step S157. This is because it is not desirable to continue all cylinder deactivation when a sufficient brake master power internal negative pressure MPGA cannot be obtained.

In step S151, it is judged whether the residual battery capacity QBAT is within a predetermined range (all cylinder deactivation continuation execution lower residual capacity limit #QBALCSL (for example 30%)≦QBAT s all cylinder deactivation continuation execution upper residual capacity limit #QBALCSH (for example 80%)). As a result of the judgment in step S151, if the residual battery capacity QBAT is judged to be within the predetermined range, control proceeds to step S152. If the residual battery capacity QBA is outside of the predetermined range, control proceeds to step S157. In the case where the residual battery capacity QBA is lower than the all cylinder deactivation continuation execution lower residual capacity limit #QBALCSL, or higher than the all cylinder deactivation continuation execution upper residual capacity limit #QBALCSH, all cylinder deactivation is cancelled. This is because if the residual battery capacity QBAT is too low, the energy required for engine drive assist by the motor M, which is performed when resuming from all cylinder deactivation, cannot be ensured. Furthermore, this is because if the residual battery capacity QBAT is too high, regeneration cannot be obtained.

In step S152, it is judged whether the idle judgment flag F_THIDLMG is "1". In the case where the judgment result is "yes" (not fully closed), control proceeds to step S157, and in the case where the judgment result is "no" (fully closed state), control proceeds to step S153. This is so that if the throttle opens even a little from the fully closed throttle state, continuation of all cylinder deactivation is cancelled.

In step S153, it is judged whether the engine oil pressure POIL is greater than or equal to an all cylinder deactivation continuation execution lower oil pressure limit #POALCS (for example 98 to 137 kPa (1.0 to 1.4 kg/cm$^2$) with hysteresis). In the case where the judgment result is "yes", control proceeds to step S154, and in the case where the judgment result is "no", control proceeds to step S157. This is because if the engine oil pressure POIL is lower than the all cylinder deactivation continuation execution lower oil pressure limit #POALCS, it is not possible to obtain a sufficient oil pressure (for example, oil pressure to operate the spool valve SV), to perform cylinder deactivation.

In step S154, since the all cylinder deactivation cancellation condition is not satisfied, the all cylinder deactivation cancellation condition satisfaction flag F_ALCSSTP is set to "0" in order to continue all cylinder deactivation, and control terminates.

[Fuel Cut Execution Judgment Processing]

Figure 9:
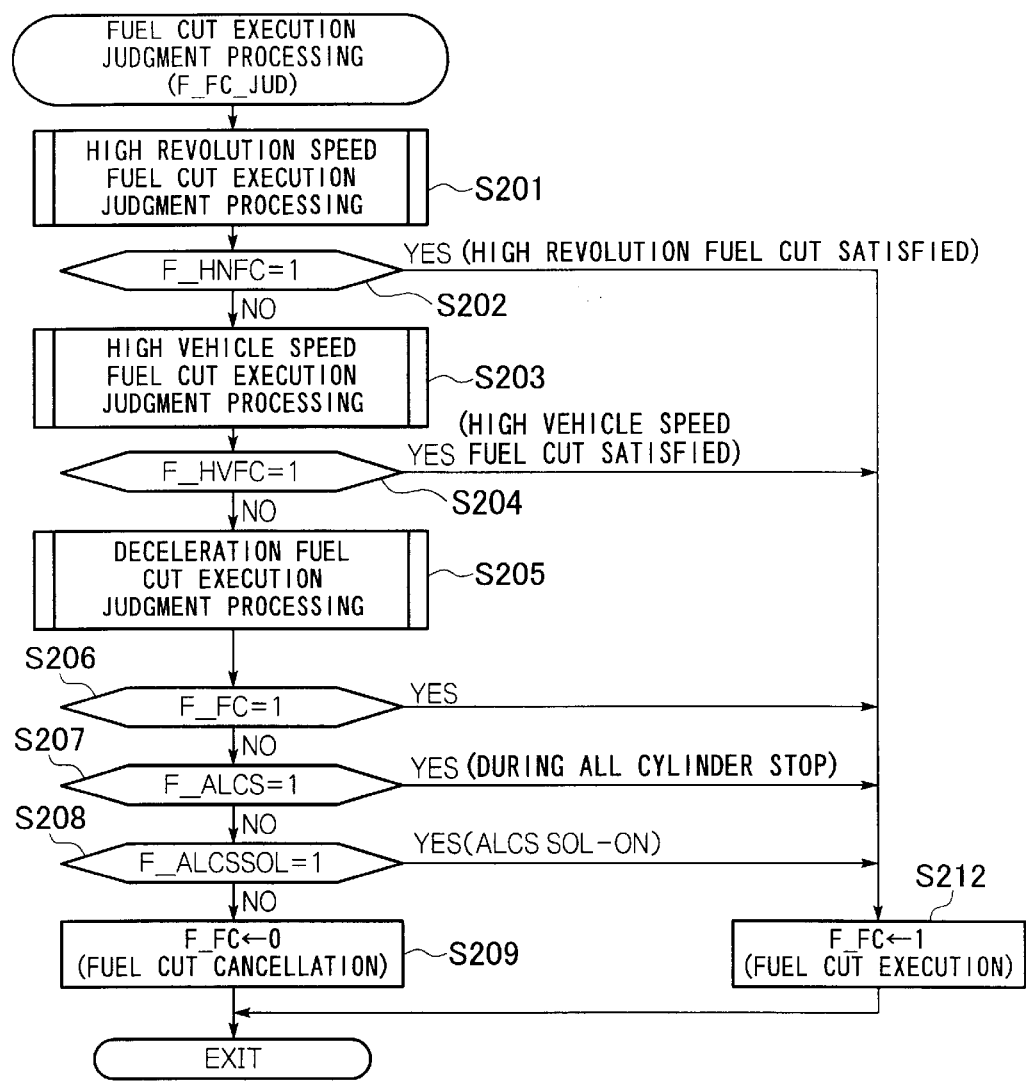
FIG. 9 is a flow chart showing fuel cut execution judgment processing of the embodiment.

Next is a description of fuel cut execution judgment processing based on FIG. 9. This processing is repeated at a predetermined cycle time.

Normally, the fuel is cut when a certain condition is satisfied with an object of protecting the engine and improving the fuel consumption. However, a condition related to all cylinder deactivation is added to the judgment processing for determining whether this fuel cut is to be performed.

In step S201, high revolution fuel cut execution judgment processing is performed, and control proceeds to step S202. This fuel cut is performed to protect the engine when the engine revolves at high speed (for example, engine revolution speed NE is greater than 6200 rpm). The setting and resetting of a high revolution fuel cut flag F_HNFC are performed by this processing.

In step S202, it is judged whether the high revolution fuel cut flag F_HNFC is "1". In the case where the judgment result is "yes" (high revolution fuel cut satisfied), control proceeds to step S212, and in the case where the judgment result is "no", control proceeds to step S203.

In step S212, a fuel cut flag F_FC is set to "1", and control terminates. Here, in the case where the fuel cut flag FFC is "1", fuel injection is not performed. The fuel cut flag F_FC constitutes a fuel supply stop device.

In step S203, high vehicle speed fuel cut execution judgment processing is performed, and control proceeds to step S204. This fuel cut is performed from the viewpoint of limiting speed when the vehicle speed is high (for example, greater than 180 km/h). The setting and resetting of a high vehicle speed fuel cut flag F_HVFC are performed by this processing.

In step S204, it is judged whether the high vehicle speed fuel cut flag F_HVFC is "1". In the case where the judgment result is "yes" (high vehicle speed fuel cut satisfied), control proceeds to step S212, and in the case where the judgment result is "no", control proceeds to step S205.

In step S205, deceleration fuel cut execution judgment processing is performed, and control proceeds to step S206. This fuel cut is performed to improve fuel consumption in a case where the vehicle is decelerating. The setting and resetting of the deceleration fuel cut flag F_FC is performed by this processing.

In step S206, it is judged whether the fuel cut flag F_FC is "1". In the case where the judgment result is "yes", control proceeds to step S212, and in the case where the judgment result is "no", control proceeds to step S207. Here, in a case where the fuel cut flag F_FC becomes "1" in deceleration mode, the fuel is cut.

In step S207, it is judged whether the all cylinder deactivation execution flag F_ALCS is "1". In the case where the judgment result is "yes" (during all cylinder deactivation), control proceeds to step S212, and in the case where the judgment result is "no", control proceeds to step S208.

In step S208, it is judged whether the all cylinder deactivation solenoid flag F_ALCSSOL is "1". In the case where the judgment result is "yes" (all cylinder deactivation solenoid on), control proceeds to step S212, and in the case where the judgment result is "no", control proceeds to step S209.

Accordingly, in the case where the intake valve and exhaust valve are closed during all cylinder deactivating operation (F_ALCS=1) (step S207), and in the case where the all cylinder deactivation solenoid flag F_ALCSSOL is "1" (step S208), fuel cut is continued.

Even if the all cylinder deactivation execution flag F_ALCS becomes "0" when resuming normal operation from an all cylinder deactivating operation, during the time from when the all cylinder deactivation solenoid flag F_ALCSSOL is "0", that is the all cylinder deactivation solenoid is off, until operation is resumed completely, there is a possibility that the cylinders are deactivated. Therefore, the arrangement is such that a judgment of the all cylinder deactivation solenoid flag F_ALCSSOL is added in step S208, and in the case where the all cylinder deactivation solenoid flag F_ALCSSOL becomes "0", fuel cut is cancelled (F_FC=0).

In step S209, the fuel cut flag F_FC is set to "0", fuel cut is cancelled, and control terminates.

[Assist Trigger Judgment Processing]

Figure 10:
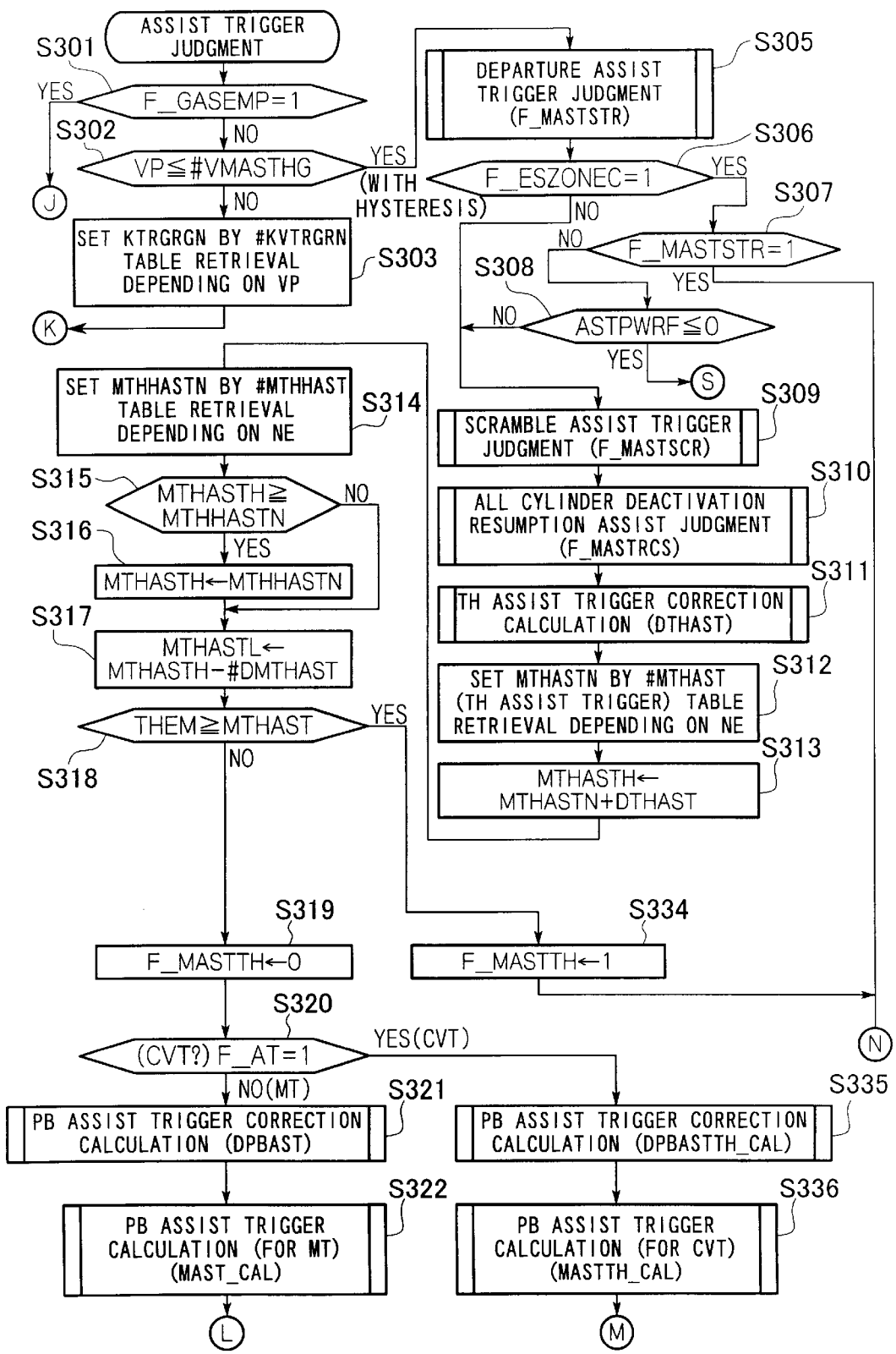
FIG. 10 is a flow chart for assist trigger judgment of the embodiment.
Figure 11:
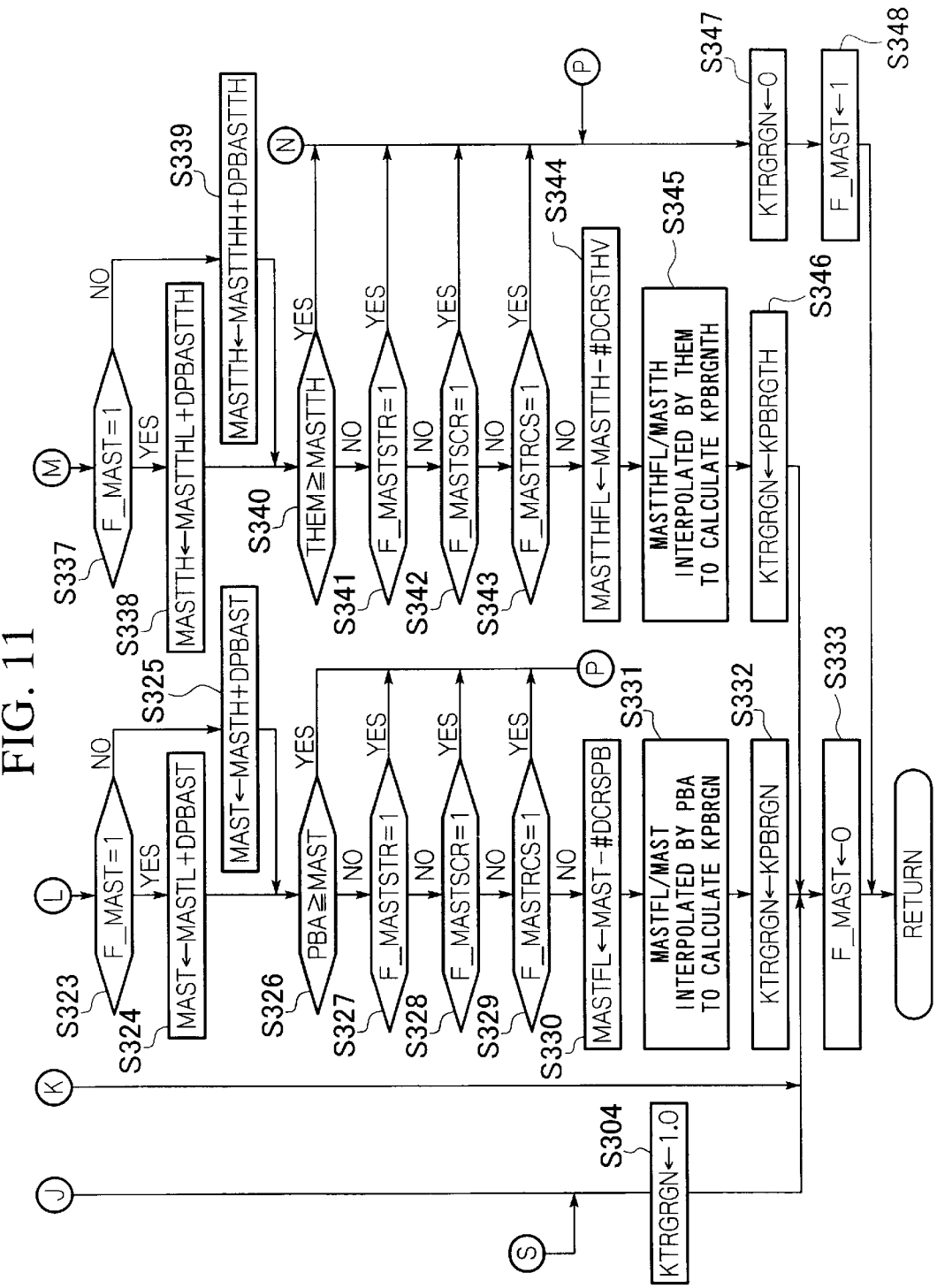
FIG. 11 is a flow chart for assist trigger judgment of the embodiment.

Next, the assist trigger judgment processing will be described based on the flowcharts shown in FIG. 10 and FIG. 11. This assist trigger judgment processing is the processing for judging whether it is an assist mode or a cruise mode, and set or reset of a motor assist judgment flag F_MAST is performed here. In this assist trigger judgment processing, in the case where an accelerator pedal is pressed during the all cylinder deactivating operation, judgment related to the all cylinder deactivation resumption assist is provided so that assist by the motor can be performed until the engine resumes to the normal operation.

In step S301, it is judged whether a gas empty condition judgment flag F_GASEMP is "1". In the case where the judgment result is "yes", control proceeds to step S304, and in the case where the judgment result is "no", control proceeds to step S302.

In step S304, a cruise electric power generation subtraction coefficient KTRGRGN is set to "1.0", and in step S333, the motor assist judgment flag F_MAST is set to "0", and this processing is repeated. In this case, the engine is not drive-assisted by the motor.

In step S302, it is judged whether the vehicle speed VP is less than or equal to an assist trigger retrieval upper limit vehicle speed #VMASTHG. This value #VMASTHG has a value having hysteresis. In the case where the judgment result is "yes", control proceeds to step S305, and in the case where the judgment result is "no", control proceeds to step S303.

In step S303, a coefficient #KVTRGRN obtained by table retrieval is set to the cruise electric power generation correction coefficient KTRGRGN in a high speed region, corresponding to the vehicle speed VP, and control proceeds to step S333. The coefficient #KVTRGRN is a coefficient having a tendency to increase corresponding to the vehicle speed VP, and is constant in the low speed region and the high speed region.

In step S305, departure assist trigger judgment is performed and control proceeds to step S306. This departure assist trigger judgment is the processing for calculating an assist trigger value and the assist amount separately from the normal assist amount, at the time of departure at a high negative pressure at which an inlet pipe negative pressure PB is not less than a predetermined pressure, for improving the departure performance. As a result of this processing, in the case where it is judged that the departure assist control is necessary, a departure assist request flag F_MASTSTR is set to "1".

In step S306, it is judged whether an energy storage zone C flag F_ESZONEC (indicating that the remaining amount is less than about 20%) is "1". In the case where the judgment result is "yes", control proceeds to step S307, and in the case where the judgment result is "no", control proceeds to step S309.

In step S307, it is judged whether the departure assist request flag F_MASTSTR is "1". In the case where the judgment result is "yes", control proceeds to step S347, and in the case where the judgment result is "no", control proceeds to step S308. In step S347, the cruise electric power generation subtraction coefficient KTRGRGN is set to "0", and in step S348, the motor assist judgment flag F_MAST is set to "1", and this processing is repeated. As a result, the drive of the engine is assisted by the motor.

In step S308, it is judged whether a final assist command value ASTPWRF is less than or equal to 0. In the case where the judgment result is "yes", control proceeds to step S304, and in the case where the judgment result is "no", control proceeds to step S309.

In step S309, scramble assist trigger judgment is performed and control proceeds to step S310. This scramble assist trigger judgment is the judgment for improving the perceived feeling of acceleration by increasing the assist amount temporarily at the time of acceleration. Basically, when the rate of throttle change is high, the arrangement is such that the scramble assist request flag F_MASTSCR is set to "1".

In step S310 (the cylinder resumption assist judgment device), all cylinder deactivation resumption assist trigger judgment described later is performed, and control proceeds to step S311. This all cylinder deactivation resumption assist trigger judgment is the judgment for smoothly performing a shift from the all cylinder deactivated condition to the normal driving without unpleasant feeling, by assisting the drive of the engine by the motor while the engine resumes, in the case where a driver presses the accelerator pedal. When this judgment is performed, an all cylinder deactivation resumption assist request flag F_MASTRCS is set to "1".

In step S311, calculation processing of a throttle assist trigger correction value DTHAST is performed and control proceeds to step S312. This correction value calculation processing is for determining an increased amount of an assist trigger threshold value, in the case where the remaining capacity of the battery is small, or there is a load due to an air conditioner or the like.

Figure 16:
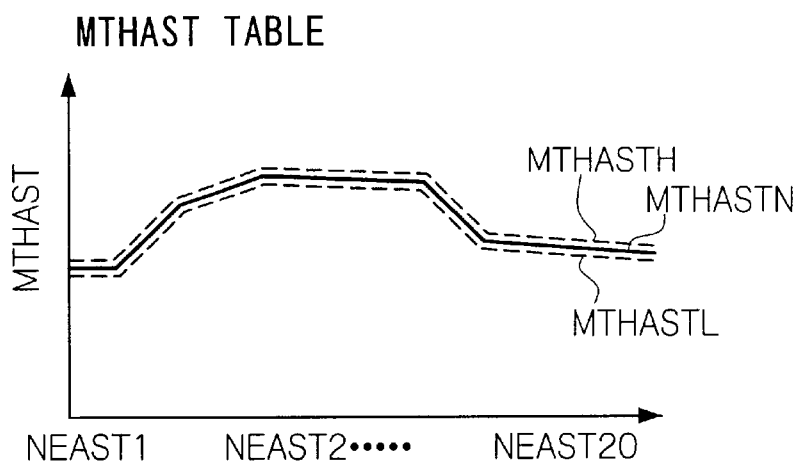
FIG. 16 is a graph showing a throttle assist trigger table of the embodiment.

In step S312, a threshold value #MTHASTN, being a reference for the throttle assist trigger, is retrieved from a throttle assist trigger table, and control proceeds to step S313. In this throttle assist trigger table, as shown in FIG. 16, the threshold value MTHASTN for the throttle opening, being the basis of a judgment of whether the motor assist is applied at the engine speed NE, is determined.

In step S313, the correction value DTHAST computed in the aforementioned step S311 is added to the reference threshold value MTHASTN for the throttle assist trigger obtained in step S312 to obtain a high throttle assist trigger threshold value MTHASTH, and control proceeds to step S314.

In step S314, an upper limit #MTHHAST is retrieved from a throttle assist trigger upper limit table, corresponding to the engine speed NE, and set to the throttle assist trigger upper limit MTHHASTN, and control proceeds to step S315.

In step S315, it is judged whether the high throttle assist trigger threshold value MTHASTH is greater than or equal to the throttle assist trigger upper limit MTHHASTN. In the case where the judgment result is "yes", control proceeds to step S316, and in the case where the judgment result is "no", control proceeds to step S317.

In step S316, the throttle assist trigger upper limit MTHHASTN is substituted for the high throttle assist trigger threshold value MTHASTH, and control proceeds to step S317.

In step S317, a difference #DMTHAST for setting the hysteresis is subtracted from the high throttle assist trigger threshold value MTHASTH, to obtain a low throttle assist trigger threshold value MTHASTL, and control proceeds to step S318.

In step S318, it is judged whether the current value THEM of the throttle opening is greater than or equal to the throttle assist trigger threshold value MTHAST. In the case where the judgment result is "yes", control proceeds to step S334, and in the case where the judgment result is "no", control proceeds to step S319. The throttle assist trigger threshold value MTHAST in this case is a value having a hysteresis.

In step S334, a throttle motor assist judgment flag F_MASTTH is set to "1", and control proceeds to step S347, and in step S319, the throttle motor assist judgment flag F_MASTTH is set to "0", and control proceeds to step S320. In the case where the throttle motor assist judgment flag F_MASTTH is "1", it means that the throttle opening TH is an opening requiring motor assist, and in the case where the throttle motor assist judgment flag F_MASTTH is "0", it means that the throttle opening TH is not an opening requiring motor assist. In the case where the throttle motor assist judgment flag F_MASTTH is "0", it is further judged hereinafter whether assist is to be performed, by the inlet pipe negative pressure PB.

In step S320, it is judged whether a MT/CVT judgment flag F_AT is "1". In the case where the judgment result is "yes" (CVT vehicle), control proceeds to step S335, and in the case where the judgment result is "no" (MT vehicle), control proceeds to step S321.

In step S321, calculation processing of an inlet pipe negative pressure assist trigger correction value DPBAST is performed and control proceeds to step S322. This processing is processing for increasing the assist trigger threshold value, in accordance with the case where the 12V power consumption is large, corresponding to the atmospheric pressure.

Figure 17:
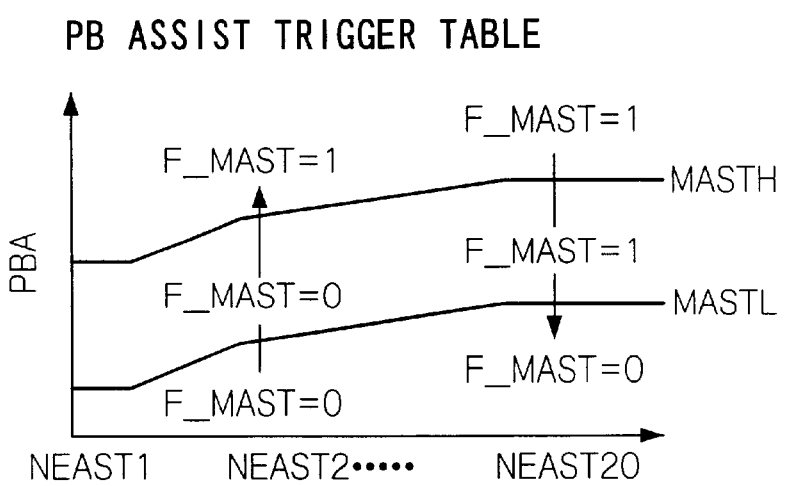
FIG. 17 is a graph of MT vehicle threshold values in an inlet pipe negative pressure assist mode of the embodiment.

In step S322, inlet pipe negative pressure assist trigger threshold value MASTL/H (for MT) is retrieved from an inlet pipe negative pressure assist trigger table, and control proceeds to step S323. In this inlet pipe negative pressure assist trigger table, as shown by two solid lines in FIG. 17, the high inlet pipe negative pressure assist trigger threshold value MASTH and the low inlet pipe negative pressure assist trigger threshold value MASTL for judging whether the motor assist is applied at the engine revolution speed NE are fixed. The arrangement is such that in the retrieval process of step S322, depending on the increase of the inlet pipe negative pressure PBA, or depending on the decrease of the engine revolution speed NE, when the high threshold value line MASTH in FIG. 17 is passed from below to above, the motor assist judgment flag F_MAST is changed from "0" to "1". Conversely, depending on the decrease of the inlet pipe negative pressure PBA, or depending on the increase of the engine revolution speed NE, when the low threshold value line MASTL is passed from above to below, the motor assist judgment flag F_MAST is changed from "1" to "0". Here, FIG. 17 performs switching at each gear and each stoichiometric/lean burn.

In step S323 it is judged whether the motor assist judgment flag F_MAST is "1". In the case where the judgment result is "yes", control proceeds to step S324, and in the case where the judgment result is 'no', control proceeds to step S325.

In step S324 the inlet pipe assist trigger threshold value MAST is computed as the sum of the inlet pipe negative assist trigger low threshold value MASTL retrieved in step S322 and the correction value DPBAST computed in step S321, and control proceeds to step S326.

In step S325 the inlet pipe assist trigger threshold value MAST is computed as the sum of the inlet pipe negative assist trigger high threshold value MASTH retrieved in step S322 and the correction value DPBAST computed in step S321, and control proceeds to step S326.

In step S326, it is judged whether the inlet pipe negative pressure current value PBA of is greater than or equal to the inlet pipe assist trigger threshold value MAST obtained in step S324 or step S325. In the case where the judgment result is "yes", control proceeds to step S347. In the case where the judgment result is "no", control proceeds to step S327.

In step S327, it is judged whether the departure assist request flag F_MASTSTR is "1". In the case where the judgment result is "yes", control proceeds to step S347. In the case where the judgment result is "no ", control proceeds to step S328.

In step S328, it is judged whether the scramble assist request flag F_MASTSCR is "1". In the case where the judgment result is "yes", control proceeds to step S347. In the case where the judgment result is "no", control proceeds to step S329.

In step S329, it is judged whether the all cylinder deactivation resumption assist request flag F_MASTRCS is "1". In the case where the judgment result is "yes", control proceeds to step S347. In the case where the judgment result is "no", control proceeds to step S330. As a result, in the case where the all cylinder deactivation resumption assist request flag F_MASTRCS is "1", in step S348, the drive of the engine is assisted by the motor. Hence, insufficient driving force of the engine is drive-assisted by the motor, and an unpleasant feeling is removed.

Figure 18:
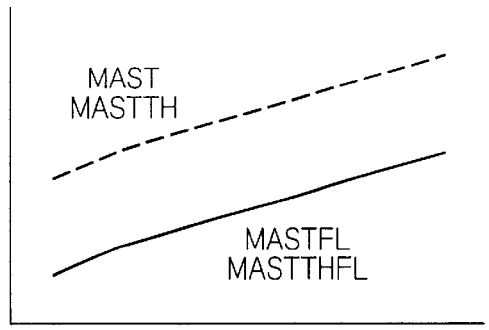
FIG. 18 is a graph for obtaining numerical values in step S330 and step S344 of the embodiment.

In step S330, as shown in FIG. 18, the final inlet pipe negative pressure assist trigger lower threshold value MASTFL is obtained by subtracting a predetermined inlet pipe negative pressure delta value #DCRSPB from the above-mentioned inlet pipe negative pressure assist trigger threshold value MAST, and control proceeds to step S331.

Figure 19:
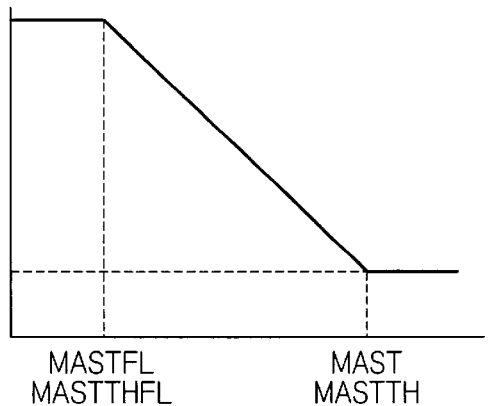
FIG. 19 is a graph for computations in step S331 and step S345 of the embodiment.

In step S331 the final inlet pipe negative pressure assist trigger lower threshold value MASTFL and the inlet pressure assist trigger threshold value MAST are interpolated from the inlet pipe negative pressure current value PBA as shown in FIG. 19 to obtain the cruise generation subtraction coefficient table value KPBRGN. In step S332 the cruise generation subtraction coefficient table value KPBRGN is set to the cruise generation subtraction coefficient KTRGRGN, and control proceeds to step S333.

In step S335, calculation processing of an inlet pipe negative pressure assist trigger correction value DPBASTTH is performed and control proceeds to step S336. This processing is processing for increasing the assist trigger threshold value, in accordance with the case where the 12V power consumption is large, corresponding to the atmospheric pressure.

In step S336 the inlet pipe negative pressure assist trigger threshold value MASTTHL/H (for CVT) is retrieved from the inlet pipe negative pressure assist trigger table, and control proceeds to step S337. In this inlet pipe negative pressure assist trigger table, as shown by two solid lines in FIG. 20, the high inlet pipe negative pressure assist trigger threshold value MASTTHH and the low inlet pipe negative pressure assist trigger threshold value MASTTHL for judging whether the motor assist is applied at the vehicle speed VP are fixed.

Figure 20:
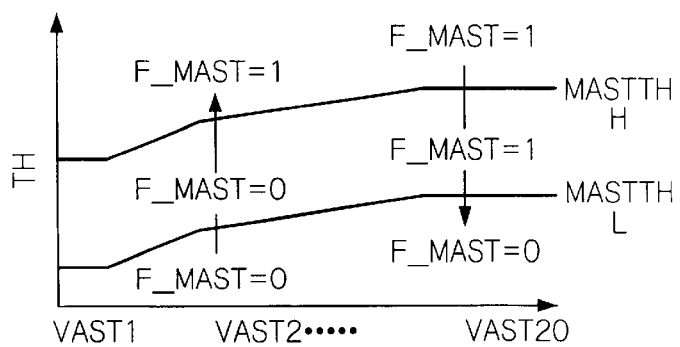
FIG. 20 is a graph of CVT vehicle threshold values in an inlet pipe negative pressure assist mode of the embodiment.

The arrangement is such that in the retrieval process of step S336, depending on the increase of the throttle opening TH, or depending on the decrease of the vehicle speed VP, when the high threshold value line MASTTHH of FIG. 20 is passed from below to above, the motor assist judgment flag F_MAST is changed from "0" to "1". Conversely, depending on the decrease of the throttle opening TH, or depending on the increase of the vehicle speed VP, when the low threshold value line MASTTHL is passed from above to below, the motor assist judgment flag F_MAST is changed from "1" to "0". Here, FIG. 20 performs switching at each gear and each stoichiometric/lean burn.

In the next step S337 it is judged whether the flag setting of the motor assist judgment flag F_MAST is "1". In the case where the judgment result is "yes", control proceeds to step S338. In the case where the judgment result is not 'no", control proceeds to step S339.

In step S338 the inlet pipe assist trigger threshold value MASTTH is computed as the sum of the inlet pipe negative assist trigger low threshold value MASTTHL retrieved in step S336 and the correction value DPBASTITH computed in step S335, and control proceeds to step 340.

In step S339 the inlet pipe assist trigger threshold value MASTTH is computed as the sum of the inlet pipe negative pressure assist trigger high threshold value MASTTHH retrieved in step S336 and the correction value DPBASTTH computed in step S335, and control proceeds to step S340.

In step S340, it is judged whether the current value THEM of the throttle opening is greater than or equal to the inlet pipe assist trigger threshold value MASTTH obtained in step S338 or step S339. In the case where the judgment result is "yes", control proceeds to step S347. In the case where the judgment result is "no", control proceeds to step S341.

In step S341, it is judged whether the departure assist request flag F_MASTSTR is "1". In the case where the judgment result is "yes", control proceeds to step S347. In the case where the judgment result is "no", control proceeds to step S342.

In step S342, it is judged whether the scramble assist request flag F_MASTSCR is "1". In the case where the judgment result is "yes", control proceeds to step S347. In the case where the judgment result is "no", control proceeds to step S343.

In step S343, it is judged whether the all cylinder deactivation resumption assist request flag F_MASTRCS is "1". In the case where the judgment result is "yes", control proceeds to step S347. In the case where the judgment result is "no", control proceeds to step S344. As a result, in the case where the all cylinder deactivation resumption assist request flag F_MASTRCS is "1", in step S348, the drive of the engine is assisted by the motor. Hence, insufficient driving force of the engine is drive-assisted by the motor, and an unpleasant feeling is removed.

In step S344, as shown in FIG. 18, the final inlet pipe negative pressure assist trigger lower threshold value MASTTHFL is obtained by subtracting a predetermined throttle opening delta value #DCRSTHV from the above-mentioned inlet pipe negative pressure assist trigger threshold value MASTTH, and control proceeds to step S345.

In step S345, the final inlet pipe negative pressure assist trigger lower threshold value MASTTHFL and the inlet pressure assist trigger threshold value MASTTH are interpolated from the throttle opening current value THEM as shown in FIG. 19 to obtain the cruise generation subtraction coefficient table value KPBRGTH. In step S346 the cruise generation subtraction coefficient table value KPBRGTH is set to the cruise generation subtraction coefficient KTRGRGN, and control proceeds to step S333.

[CS (All Cylinder deactivation) Return Assist Trigger Judgment]

Figure 12:
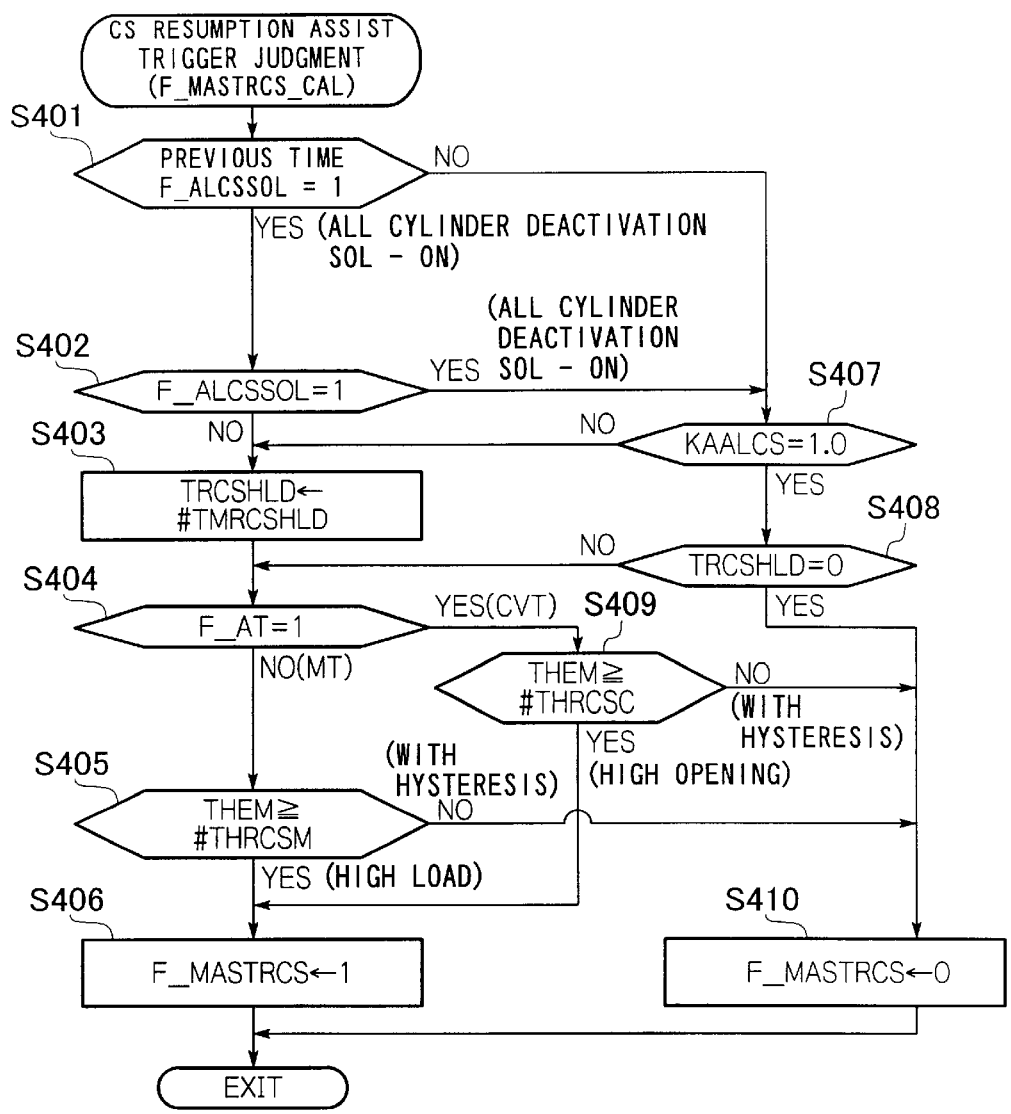
FIG. 12 is a flow chart for all cylinder deactivation assist trigger judgment of the embodiment.

The all cylinder deactivation resumption assist trigger judgment will now be described with reference to FIG. 12. The all cylinder deactivation resumption assist is for smoothly performing the shift from the all cylinder deactivated condition to the normal driving, at the time of assisting the drive of the engine by the motor until the engine resumes from the all cylinder deactivated condition and again accelerates, in the case where a driver presses the accelerator pedal. In this all cylinder deactivation resumption assist trigger judgment, set or reset of the all cylinder deactivation resumption assist request flag F_MASTRCS is performed, which determines whether this assist is to be performed. This processing is repeated in a predetermined cycle time.

In step S401, it is judged whether the value of a solenoid flag F_ALCSSOL for the all cylinder deactivation of the last time is "1". In the case where the judgment result is "yes" (a solenoid for the all cylinder deactivation of a spool valve SV is ON), control proceeds to step S402, and in the case where the judgment result is "no" (the solenoid for the all cylinder deactivation of a spool valve SV is OFF), control proceeds to step S407.

In step S402, it is judged whether the solenoid flag F_ALCSSOL for the all cylinder deactivation is "1". In the case where the judgment result is "yes" (a solenoid for the all cylinder deactivation of a spool valve SV is ON), control proceeds to step S402, and in the case where the judgment result is "no" (the solenoid for the all cylinder deactivation of a spool valve SV is OFF), control proceeds to step S403.

In this manner, assuming the case where the solenoid flag F_ALCSSOL for the all cylinder deactivation is "1" in step S401, and the solenoid flag F_ALCSSOL for the all cylinder deactivation is "0" in step S402, the all cylinder deactivation resumption assist request flag F_MASTRCS is set in step S406.

In step S403, a predetermined value #TMRCSHLD is set to an all cylinder deactivation resumption assist continuation timer TRCSHLD, and control proceeds to step S404.

In step S404, it is judged whether the MT/CVT judgment flag F_AT is "1". In the case where the judgment result is "no" (MT vehicle), that is, it is a hybrid vehicle having a manual transmission, control proceeds to step S405. In the case where the judgment result is "yes" (AT/CVT vehicle), that is, it is a hybrid vehicle having an automatic transmission, control proceeds to step S409.

Figure 21:
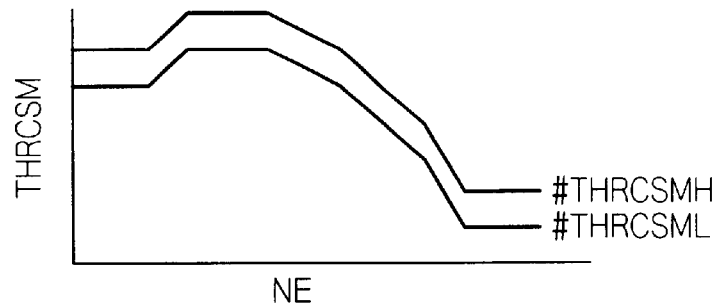
FIG. 21 is a graph showing an all cylinder deactivation resumption assist trigger judgement table for an MT vehicle, of the embodiment.

In step S405, it is judged whether the current value of the throttle opening THEM is greater than or equal to a predetermined value, that is, is greater than or equal to the threshold value #THRCSM of the throttle opening in the all cylinder deactivation resumption assist trigger judgment TH table. In the case where the judgment result is "yes" (high load), control proceeds to step S406, and in the case where the judgment result is "no", control proceeds to step S410. The threshold value #THRCSM is a value having a hysteresis (#THRCSMH/#THRCSML), and as shown in FIG. 21, is set corresponding to the engine speed NE. Here, the reason why the judgment is performed based on the throttle opening THEM and the engine speed NE is that in the all cylinder deactivated condition, the inlet valve IV and the exhaust valve EV are closed, and hence the inlet pipe negative pressure is not generated, and therefore, this cannot be used as a reference.

In step S406, the all cylinder deactivation resumption assist request flag F_MASTRCS is set to "1", and the control is completed. As a result, the drive of the engine is assisted by the motor.

In step S410, the all cylinder deactivation resumption assist request flag F_MASTRCS is set to "0", and the control is completed.

Figure 22:
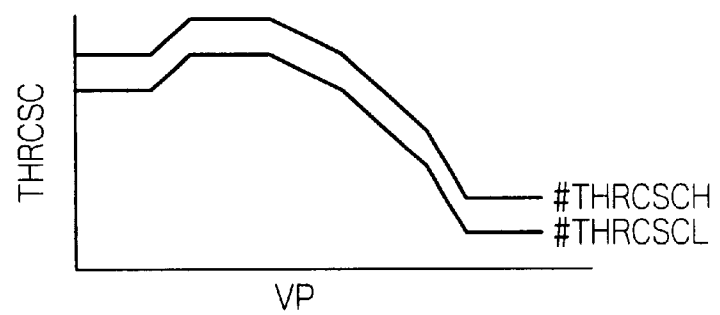
FIG. 22 is a graph showing an all cylinder deactivation resumption assist trigger judgement table for a CVT vehicle, of the embodiment.

In step S409, it is judged whether the current value of the throttle opening THEM is greater than or equal to a predetermined value, that is, is greater than or equal to the threshold value #THRCSC of the throttle opening in the all cylinder deactivation resumption assist trigger judgment TH table. In the case where the judgment result is "yes" (high opening), control proceeds to step S406, and in the case where the judgment result is "no", control proceeds to step S410. The threshold value #THRCSC is a value having a hysteresis (#THRCSCH/#THRCSCL), and as shown in FIG. 22, is set corresponding to the vehicle speed VP. Here, the reason why the judgment is performed based on the throttle opening THEM and the vehicle speed VP is that in the all cylinder deactivated condition, the inlet valve IV and the exhaust valve EV are closed, and hence the inlet pipe negative pressure is not generated, and therefore, this cannot be used as a reference.

In step S407, it is judged whether an incremental fuel coefficient KAALCS at the time of fuel resumption is "1.0". In the case where the judgment result is "yes", control proceeds to step S408, and in the case where the judgment result is "no", control proceeds to step S403. When this incremental fuel coefficient KAALCS after the fuel resumption is "1.0" (a coefficient corresponding to the predetermined value of the fuel injection amount), it is the normal injection quantity. That is to say, the all cylinder deactivation resumption assist is continued until this incremental fuel coefficient KAALCS becomes "1.0", and when the incremental fuel coefficient KAALCS becomes "1.0", the all cylinder deactivation resumption assist is stopped. Here, the incremental fuel coefficient KAALCS is a coefficient gradually approaching "1" with an increment amount determined corresponding to the throttle opening TH, in the case where the all cylinder deactivation execution flag F_ALCS becomes "1".

In step S408, it is judged whether the all cylinder deactivation resumption assist continuation timer TRCSHLD (predetermined value) is "0". In the case where the judgment result is "yes", control proceeds to step S410, and in the case where the judgment result is "no", control proceeds to step S404. As described above, since the all cylinder deactivation resumption assist continuation timer TRCSHLD is provided, the drive assist by means of the motor is performed, until the engine generates the normal output, after having resumed from the all cylinder deactivated condition and the fuel injection amount has become a predetermined amount, to thereby ensure a smooth shift to the normal operation.

[Acceleration Mode]

Figure 13:
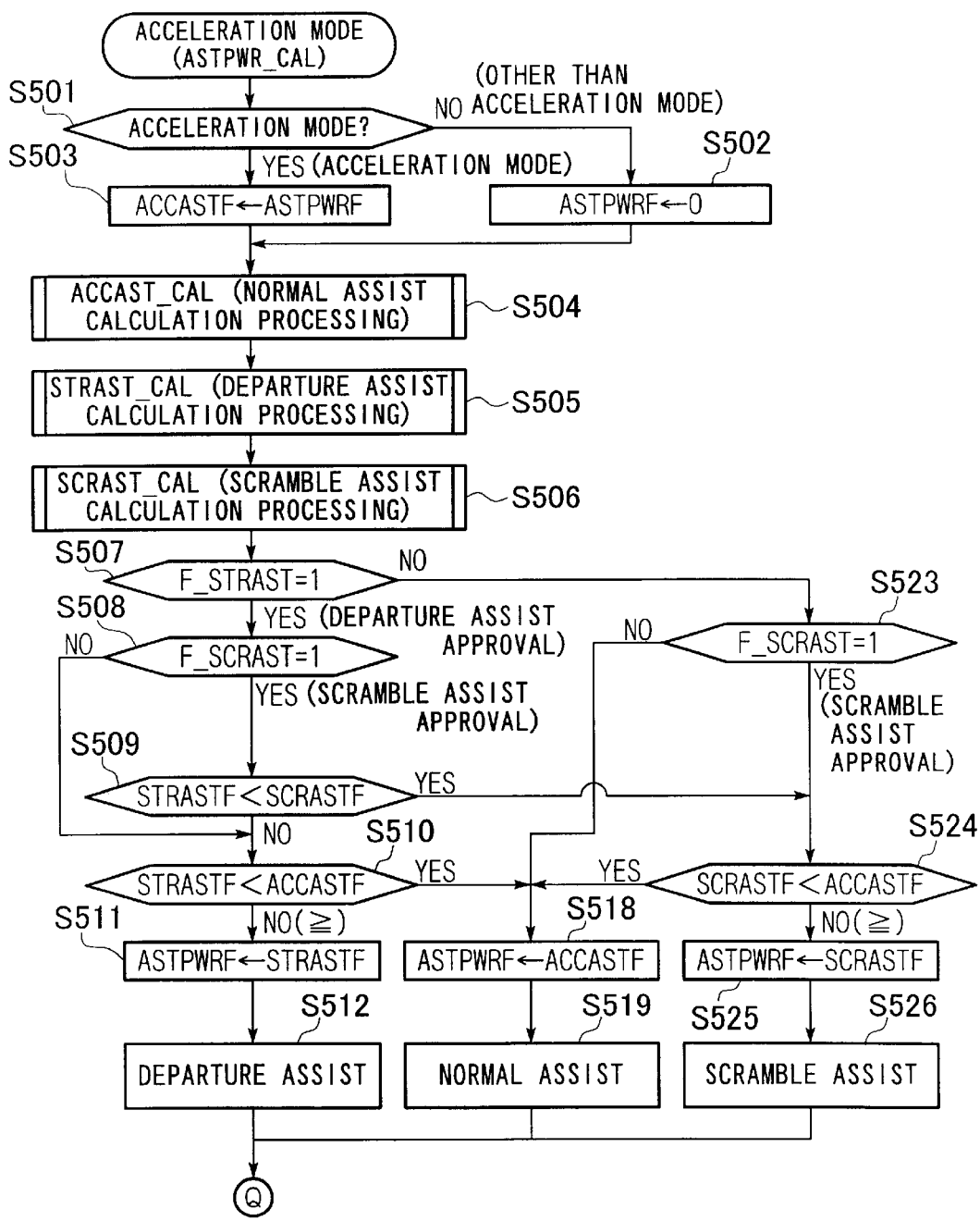
FIG. 13 is a flow chart for acceleration mode of the embodiment.
Figure 14:
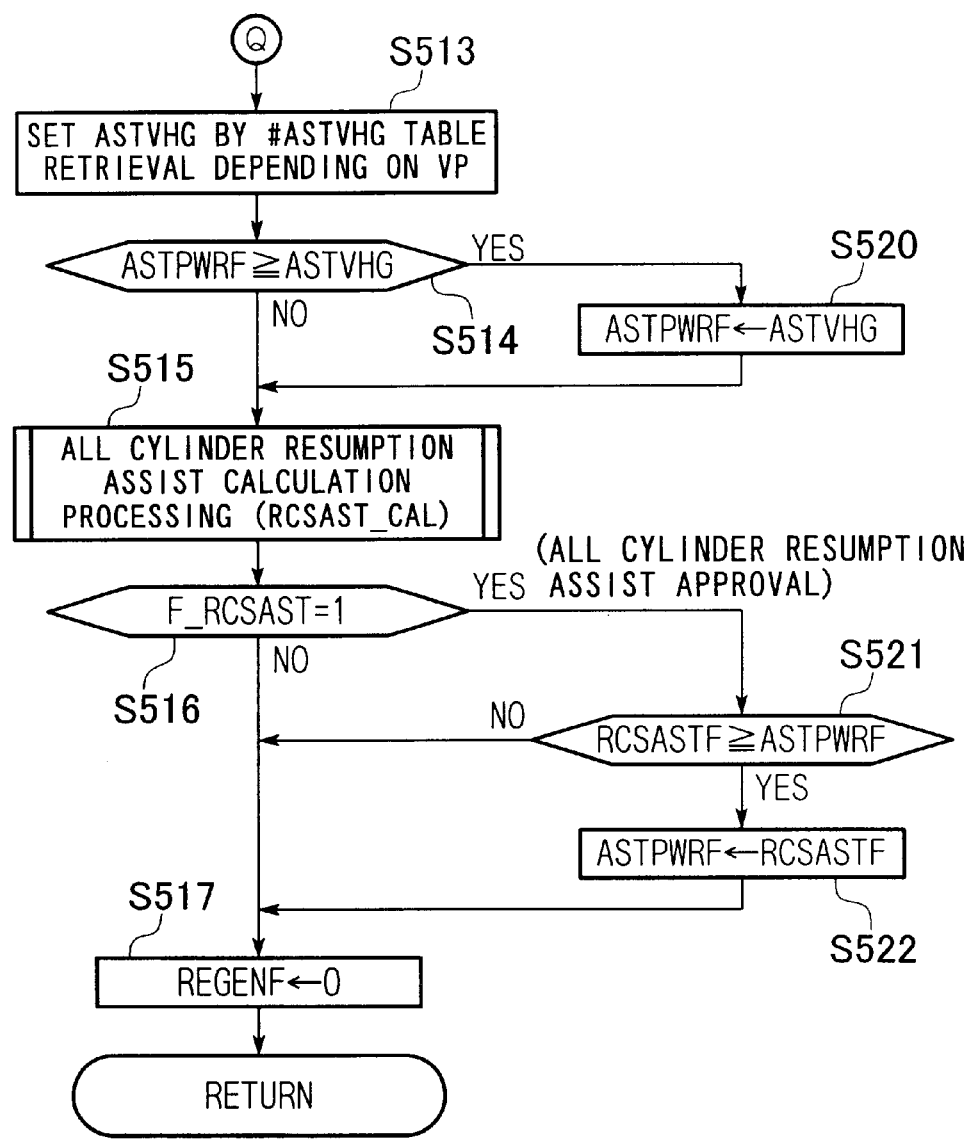
FIG. 14 is a flow chart for acceleration mode of the embodiment.

The acceleration mode will now be described, with reference to FIG. 13 and FIG. 14. In this acceleration mode, a final assist command value ASTPWRF is set. This processing is repeated in a predetermined cycle time.

In step S501, it is judged whether the engine is in the acceleration mode. In the case where the judgment result is "yes" (acceleration mode), control proceeds to step S503, and in the case where the judgment result is "no" (other than acceleration mode), control proceeds to step S502.

In step S503, the final assist command value ASTPWRF is set to a final normal assist calculation value ACCASTF, and control proceeds to step S504.

In step S502, the final assist command value ASTPWRF is set to "0", and control proceeds to step S504.

In step S504, the normal assist calculation processing (ACCAST_CAL) is performed, and in step S505, the departure assist calculation processing (STRAST_CAL) is performed. In step S506, the scramble assist calculation processing (SCRAST_CAL) is performed, and control proceeds to step S507. Here, the departure assist is for improving the departure performance, by increasing the assist amount temporarily at the time of departure, and the scramble assist is for improving the perceived feeling of acceleration, by increasing the assist amount temporarily at the time of acceleration.

In step S507, it is judged whether a departure assist approval flag F_STRAST is "1". In the case where the judgment result is "yes" (departure assist approval), control proceeds to step S508, and in the case where the judgment result is "no", control proceeds to step S523.

In step S508, it is judged whether a scramble assist approval flag F_SCRAST is "1". In the case where the judgment result is "yes" (scramble assist approval), control proceeds to step S509, and in the case where the judgment result is "no", control proceeds to step S510.

In step S509, it is judged whether the final departure assist calculation value STRASTF is less than the final scramble assist calculation value SCRASTF. In the case where the judgment result is "yes" (STRASTF<SCRASTF), control proceeds to step S524, and in the case where the judgment result is "no" (STRASTF≧SCRASTF), control proceeds to step S510.

In step S510, it is judged whether the final departure assist calculation value STRASTF is less than the final normal assist calculation value ACCASTF. In the case where the judgment result is "yes" (STRASTF<ACCASTF), control proceeds to step S518, and in the case where the judgment result is "no" (STRASTF≧ACCASTF), control proceeds to step S511.

In step S511, the final departure assist calculation value STRASTF is substituted for the final assist command value ASTPWRF, and the departure assist is set in step S512, and control proceeds to step S513.

In step S518, the final normal assist calculation value ACCASTF is substituted for the final assist command value ASTPWRF, and the normal assist is set in step S519, and control proceeds to step S513.

In step S523, it is judged whether the scramble assist approval flag F_SCRAST is "1". In the case where the judgment result is "yes" (scramble assist approval), control proceeds to step S524, and in the case where the judgment result is "no", control proceeds to step S518.

In step S524, it is judged whether the final scramble assist calculation value STRASTF is less than the final normal assist calculation value ACCASTF. In the case where the judgment result is "yes" (SCRASTF<ACCASTF), control proceeds to step S518, and in the case where the judgment result is "no" (SCRASTF<ACCASTF), control proceeds to step S525.

In step S525, the final scramble assist calculation value SCRASTF is substituted for the final assist command value ASTPWRF, and the scramble assist is set in step S526, and control proceeds to step S513.

Therefore, by means of the judgment in the previous step, the largest value among the final departure assist calculation value STRASTF, the final normal assist calculation value ACCASTF and the final scramble assist calculation value SCRASTF is set to the final assist command value ASTPWRF.

In step S513, the predetermined value #ASTVHG obtained by a table (not shown) retrieval corresponding to the vehicle speed VP is set to the assist amount upper limit ASTVHG, and control proceeds to step S514.

In step S514, it is judged whether the final assist command value ASTPWRF is greater than or equal to the assist amount upper limit ASTVHG. In the case where the judgment result is "yes", control proceeds to step S520, and in the case where the judgment result is "no", control proceeds to step S515.

In step S515, the all cylinder deactivation resumption assist calculation processing (RCSAST_CAL) is performed, and control proceeds to step S516.

In step S520, the assist amount upper limit ASTVHG is substituted for the final assist command value ASTPWRF, and control proceeds to step S515.

In step S516, it is judged whether a cylinder deactivation resumption assist approval flag F_RCSAST is "1". In the case where the judgment result is "yes" (all cylinder deactivation resumption assist approval), control proceeds to step S521, and in the case where the judgment result is "no", control proceeds to step S517.

In step S517, the final charge command value REGENF is set to "0", and the processing is repeated.

In step S521, it is judged whether the final all cylinder deactivation resumption assist calculation value RCSASTF is greater than or equal to the final assist command value ASTPWRF. In the case where the judgment result is "yes", control proceeds to step S522, and in the case where the judgment result is "no", control proceeds to step S517.

In step S522, the final all cylinder deactivation resumption assist calculation value RCSASTF is set to the final assist command value ASTPWRF, and control proceeds to step S517.

Therefore, the largest value among the final departure assist calculation value STRASTF, the final normal assist calculation value ACCASTF, the final scramble assist calculation value SCRASTF and the final all cylinder deactivation resumption assist calculation value RCSASTF is set to the final assist command value ASTPWRF.

[All Cylinder deactivation Resumption Assist Calculation Processing]

Figure 15:
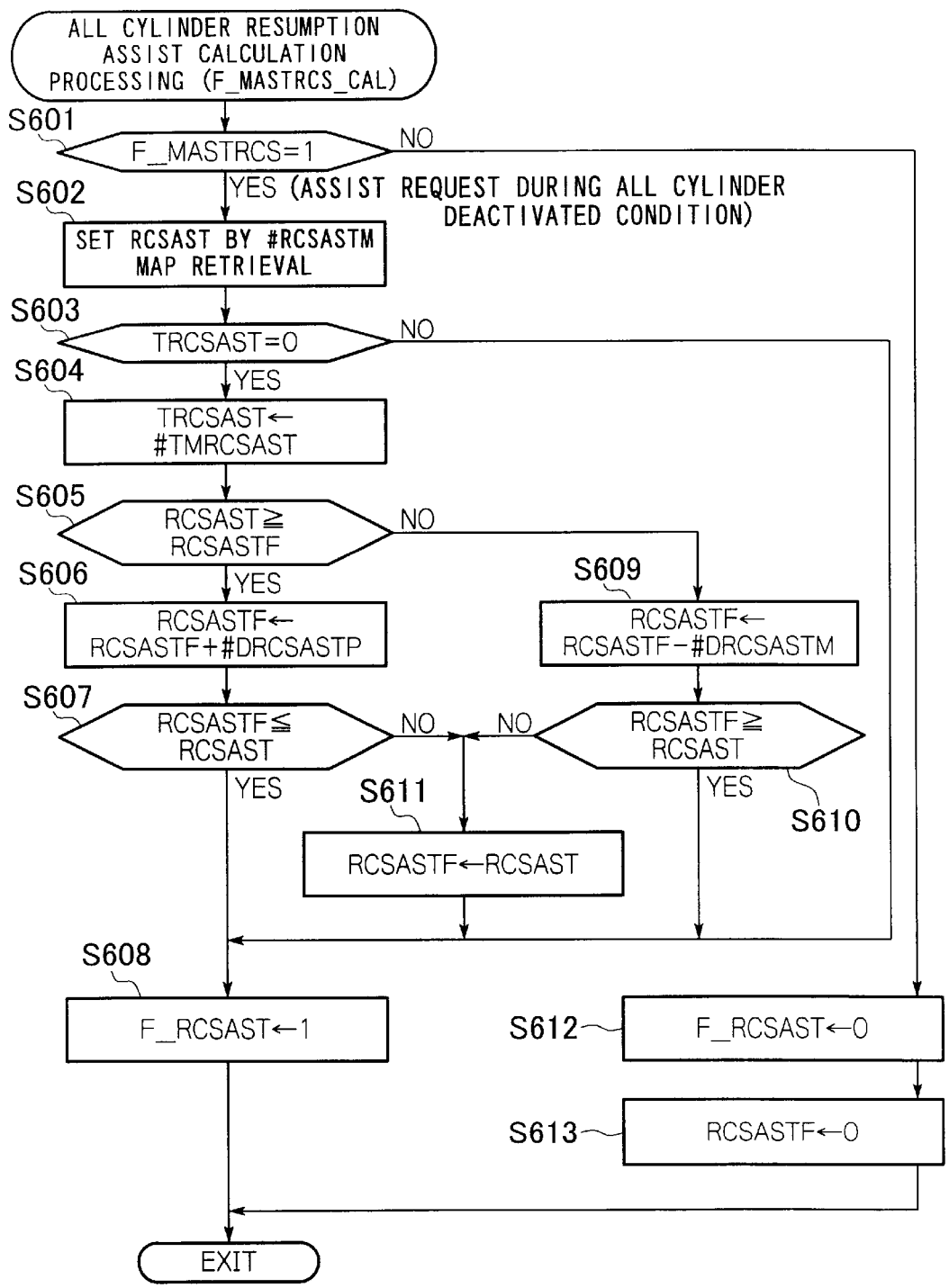
FIG. 15 is a flow chart for all cylinder deactivation resumption assist calculation processing of the embodiment.

The all cylinder deactivation resumption assist calculation processing in step S515 shown in FIG. 14 will be described, with reference to FIG. 15. In this processing, it is judged whether the assist is to be performed, in the case where the engine shifts from the all cylinder deactivated condition to the normal operation, and the assist amount is set. Specifically, it is the processing for performing set and reset of the cylinder deactivation resumption assist approval flag F_RCSAST, and calculation of the final all cylinder deactivation resumption assist calculation value RCSASTF. This processing is repeated in a predetermined cycle time.

In step S601, it is judged whether an all cylinder deactivation resumption assist request flag F_MASTRCS is "1". In the case where the judgment result is "yes", that is, when all cylinders are deactivated and there is an assist request, control proceeds to step S602, and in the case where the judgment result is "no", control proceeds to step S612.

In step S612, the cylinder deactivation resumption assist approval flag F_RCSAST is set to "0", and in step S613, the final all cylinder deactivation resumption assist calculation value RCSASTF is set to "0", thereby completing the control.

In step S602, the assist amount #RCSASTM is determined, for example, for a predetermined map, and set for the all cylinder deactivation resumption assist calculation value RCSAST, and control proceeds to step S603. Here, this map is determined from the engine speed NE and the current value THEM of the throttle opening, and a value equal to or close to the normal output of the engine is set therein. This map is common to the MT vehicle and the CVT vehicle.

In step S603, it is judged whether an incremental/decremental update timer TRCSAST is "0". In the case where the judgment result is "yes", control proceeds to step S604, and in the case where the judgment result is "no", control proceeds to step S608.

In step S604, a timer value #TMRCSAST is set to the incremental/decremental update timer TRCSAST, and control proceeds to step S605.

In step S605, it is judged whether the all cylinder deactivation resumption assist calculation value RCSAST is greater than or equal to the final all cylinder deactivation resumption assist calculation value RCSASTF. In the case where the judgment result is "yes", control proceeds to step S606, and in the case where the judgment result is "no", control proceeds to step S609.

In step S606, an incremental term #DRCSASTP of the assist amount is added to the final all cylinder deactivation resumption assist calculation value RCSASTF, and control proceeds to step S607.

In step S607, it is judged whether the final all cylinder deactivation resumption assist calculation value RCSASTF is less than or equal to the all cylinder deactivation resumption assist calculation value RCSAST. In the case where the judgment result is "yes", control proceeds to step S608, and in the case where the judgment result is "no", control proceeds to step S611. In step S611, the all cylinder deactivation resumption assist calculation value RCSAST is set to the final all cylinder deactivation resumption assist calculation value RCSASTF, and control proceeds to step S608.

In step S608, the cylinder deactivation resumption assist approval flag F_RCSAST is set to "1", to thereby complete the control.

In step S609, a decremental term #DRCSASTM of the assist amount is subtracted from the final all cylinder deactivation resumption assist calculation value RCSASTF, and control proceeds to step S610.

In step S610, it is judged whether the final all cylinder deactivation resumption assist calculation value RCSASTF is greater than or equal to the all cylinder deactivation resumption assist calculation value RCSAST. In the case where the judgment result is "yes", control proceeds to step S608, and in the case where the judgment result is "no", control proceeds to step S611.

In step S607, it is judged whether the final all cylinder deactivation resumption assist calculation value RCSASTF is greater than or equal to the all cylinder deactivation resumption assist calculation value RCSAST. In the case where the judgment result is yes", control proceeds to step S608, and in the case where the judgment result is "no", control proceeds to step S611.

In a case where the vehicle is running in a mode other than deceleration, the fuel cut flag F_FC is "0" in step S141 of FIG. 8, the all cylinder deactivation cancellation condition is satisfied (F_ALCSSTP=1), and the judgment in step S106 of FIG. 6 is "yes". Accordingly, in step S120 the all cylinder deactivation execution flag F_ALCS is "0", and all cylinder deactivation is not performed.

On the other hand, when the vehicle is running in deceleration regeneration mode (deceleration regeneration permit flag F_MADECRGN=1), the fuel cut flag F_FC is "1" in step S141 of FIG. 8, and the fuel cut flag F_FC=1 in step S212 of FIG. 9. As a result, when the previous condition of all cylinder deactivation is satisfied in step S104 of FIG. 6, and the all cylinder deactivation cancellation condition is not satisfied in step S106, the solenoid of the spool valve SV is turned on after a predetermined time (TALCSDLY1) has passed from this point of time. Then, when the oil pressure (POIL) becomes greater than or equal to a predetermined value (#POILCSH), the all cylinder deactivation execution flag F_ALCS becomes "1" in step S113 after a further predetermined time (TCSDLY1) has passed, and the all cylinder deactivating operation is performed.

Figure 23:
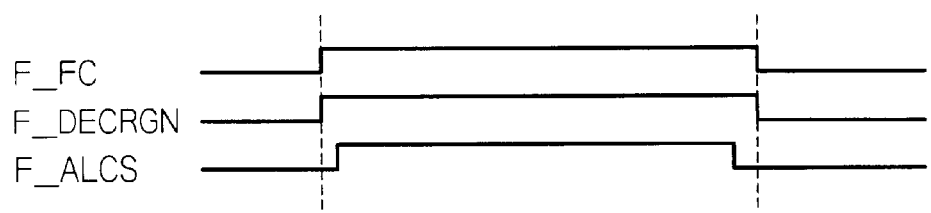
FIG. 23 is a timing chart for the embodiment of the invention.

As a result, after the fuel cut flag F_FC and the deceleration regeneration permit flag F_MADECRGN become "1" in the timing chart of FIG. 23, the all cylinder deactivation execution flag F ALCS becomes "1".

Then, when the all cylinder deactivation cancellation condition is satisfied during the all cylinder deactivating operation in step S106 of FIG. 6, the solenoid of the spool valve SV is turned off after a predetermined time (TALCSDLY2) has passed from this point of time. Then, the oil pressure (POIL) becomes less than or equal to a predetermined value (#POILCSL), the all cylinder deactivation execution flag F_ALCS becomes "0" in step S120 after a further predetermined time (TCSDLY2) has passed, and normal operation is performed. Accordingly, as shown in FIG. 9, after the all cylinder deactivation execution flag F_ALCS and the all cylinder deactivation solenoid flag F_ALCSSOL become "0", then as shown by the timing chart of FIG. 23, the fuel cut flag F_FC (and deceleration regeneration permit flag F_MADECRGN) become "0", that is, fuel cut is cancelled, and normal operation is performed.

Moreover, for example, during the all cylinder deactivating operation, in the case where a driver presses the accelerator pedal in order to accelerate, and the throttle opening THEM thereof is greater than or equal to the threshold value of the throttle opening (in the case of the MT vehicle, the threshold value #THRCSM, and in the case of the CVT vehicle, the threshold value #THRCSC), the all cylinder deactivation resumption assist request flag F_MASTRCS is set (step S406). Hence, the judgment in step S329 and step S343 becomes "yes", so that the drive of the engine is assisted by the motor in step S348 in FIG. 11.

In the case of the all cylinder deactivated condition, since the inlet pipe negative pressure is not generated, this inlet pipe negative pressure cannot be used as the reference for the judgment. However, instead of this, by means of the throttle opening THEM and the vehicle speed VP in the case of the CVT vehicle (step S408 corresponding to FIG. 22), and the throttle opening THEM and the engine speed NE in the case of the MT vehicle (step S405 corresponding to FIG. 21), the driver's intention to accelerate can be grasped.

Also, in the case of pressing the accelerator pedal for acceleration during the all cylinder deactivation resumption condition, the drive assist amount of the motor M which assists the drive of the engine E is determined from the map of the engine speed NE and the throttle opening THEM. Hence, a value equal to or close to the normal output of the engine can be set.

Since the all cylinder deactivation resumption assist continuation timer TRCSHLD (step S408) is provided, until the engine E generates the normal output, after having resumed from the all cylinder deactivated condition and the fuel injection amount has been gradually increased and reached a predetermined amount, the drive of the engine can be assisted by the motor M.

According to the above embodiment, when the all cylinder deactivated condition is determined by the all cylinder deactivation execution flag F_ALCS (=1), basically at the time of deceleration fuel cut, the cylinder deactivating operation becomes possible by means of the variable valve timing mechanism VT. Hence, the fuel efficiency can be improved by the fuel cut and the all cylinder deactivation, to suppress the fuel consumption.

In the case where cancellation of the all cylinder deactivated condition is determined by the all cylinder deactivation execution flag F_ALCS (=0), and the non-operation condition of the variable valve timing mechanism VT is detected by the solenoid flag F_ALCSSOL for the all cylinder deactivation, suspension of the fuel supply to the engine can be cancelled and resumed thereafter. Hence, the fuel is not supplied while all cylinders are in the deactivated condition, and the shift from the all cylinder deactivating operation to the normal operation can be smoothly performed without wasting fuel.

Moreover, by means of the throttle opening THEM and the vehicle speed VP in the case of the CVT vehicle, and the throttle opening THEM and the engine speed NE in the case of the MT vehicle, the driver's intention to accelerate can be grasped. As a result, the shift from the all cylinder deactivating operation to the normal operation can be smoothly performed, accurately corresponding to the intention of the driver, without giving an unpleasant feeling.

Also, in the case of pressing the accelerator pedal for acceleration during the all cylinder deactivated condition, the drive assist amount of the motor M which assists the drive of the engine E is determined from the map of the engine speed NE and the throttle opening THEM. Hence, a value equal to or close to the normal output of the engine can be set. As a result, the similar feeling to the acceleration feeling at the time of normal operation can be provided, and the engine can be shifted to the normal operation without an unpleasant feeling.

Since the all cylinder deactivation resumption assist continuation timer TRCSHLD (step S408) is provided, until the engine E generates the normal output, after having resumed from the all cylinder deactivated condition and the fuel injection amount has been gradually increased and reached a predetermined amount, the drive of the engine can be assisted by the motor M. As a result, a smooth shift to the normal operation can be ensured.

What is claimed is:

1. An assist control apparatus for a hybrid vehicle comprising an engine which drives the hybrid vehicle, and a motor which assists drive of the engine in accordance with driving conditions of the vehicle, wherein the engine is a cylinder deactivating engine which can perform a normal operation and a cylinder deactivating operation, and there is provided a cylinder resumption assist judgment device which judges whether the drive of the engine should be assisted by the motor when the engine shifts from the cylinder deactivating operation to the normal operation, and when the cylinder resumption assist judgment device detects a resumption from the cylinder deactivated condition and judges that a throttle opening is larger than a predetermined value, drive of the engine is assisted by the motor.

2. An assist control apparatus for a hybrid vehicle according to claim 1, wherein the hybrid vehicle comprises an automatic transmission, and the cylinder resumption assist judgment device judges whether the drive of the engine should be assisted by the motor based on the throttle opening and the vehicle speed.

3. An assist control apparatus for a hybrid vehicle according to claim 1, wherein the hybrid vehicle comprises a manual transmission, and the cylinder resumption assist judgment device judges whether the drive of the engine should be assisted by the motor based on the throttle opening and the engine speed.

4. An assist control apparatus for a hybrid vehicle according to claim 1, wherein an amount of drive assist by means of the motor is determined based on engine speed and throttle opening.

5. An assist control apparatus for a hybrid vehicle according to claim 1, wherein drive assist by means of the motor is continued for a predetermined period of time, after the engine has resumed from the cylinder deactivated operation and fuel injection amount in the engine has been gradually increased and has reached a predetermined value.

6. An assist control apparatus for a hybrid vehicle according to claim 1, wherein the cylinder deactivating engine comprises a plurality of cylinders, intake valves and exhaust valves respectively provided in the cylinders, and a variable valve timing system which controls opening and closing of the intake valves and the exhaust valves; and the assist control apparatus further comprises an engine control unit which controls the variable valve timing system so as to perform either one of the normal operation and the cylinder deactivating operation.

7. An assist control apparatus for a hybrid vehicle according to claim 6, wherein the engine control unit includes map data storing the relationship of engine speed values, throttle opening values, and assist amounts to be applied by the motor to the engine when an accelerator pedal is depressed for acceleration during the cylinder deactivated operation.

8. An assist control apparatus for a hybrid vehicle according to claim 6, wherein the engine control unit performs:

an idle mode operation in which fuel supply is resumed after fuel cut to maintain the engine in an idle condition;

an idle stop mode operation in which the engine is stopped;

a deceleration mode operation in which regenerative braking by the motor is performed while deactivating all the cylinders in the engine;

a cruise mode operation in which the motor is not driven so that the vehicle runs under the driving force of the engine; and an acceleration mode operation in which the engine is drive assisted by the motor.

\* \* \* \* \*